United States Patent
Powell

(10) Patent No.: US 10,684,470 B2
(45) Date of Patent: *Jun. 16, 2020

(54) ARRAY-BASED FLOATING DISPLAY

(71) Applicant: Microsoft Technology Licensing, LLC, Redmond, WA (US)

(72) Inventor: Karlton D. Powell, Lake Stevens, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 174 days.

This patent is subject to a terminal disclaimer.

(21) Appl. No.: 15/354,264

(22) Filed: Nov. 17, 2016

(65) Prior Publication Data

US 2017/0261729 A1 Sep. 14, 2017

Related U.S. Application Data

(60) Provisional application No. 62/305,512, filed on Mar. 8, 2016.

(51) Int. Cl.
*G02B 27/01* (2006.01)
*G02B 5/13* (2006.01)
(Continued)

(52) U.S. Cl.
CPC ....... *G02B 27/0101* (2013.01); *G02B 3/0062* (2013.01); *G02B 3/0087* (2013.01);
(Continued)

(58) Field of Classification Search
CPC .............. G02B 27/0101; G02B 27/01; G02B 27/1066; G02B 27/2292; G02B 27/283;
(Continued)

(56) References Cited

U.S. PATENT DOCUMENTS 2,351,034 A 6/1944 Gabor
5,270,859 A 12/1993 Wirth et al.
(Continued)

FOREIGN PATENT DOCUMENTS

CN 101297229 A 10/2008
DE 10046297 A1 2/2002
(Continued)

OTHER PUBLICATIONS

"International Search Report and Written Opinion Issued in PCT Application No. PCT/US2017/020060", dated Sep. 8, 2017, 14 Pages.
(Continued)

*Primary Examiner* — Collin X Beatty
(74) *Attorney, Agent, or Firm* — Ray Quinney & Nebeker P.C.; John O. Carpenter

(57) ABSTRACT

A lens system includes a first lens array assembly including a first plurality of cells, each cell of the first plurality of cells configured to exhibit a pair of first Fourier transform lenses, and a second lens array assembly including a second plurality of cells, each cell of the second plurality of cells configured to exhibit a pair of second Fourier transform lenses. The first and second lens array assemblies are positioned relative to one another along an optical axis of the lens system such that light diverging from an object at a plane disposed at an object conjugate distance from the first lens array assembly reconverges at an image plane after passing through the first and second lens array assemblies. The image plane is disposed at an image conjugate distance from the second lens array assembly in accordance with the object conjugate distance.

26 Claims, 10 Drawing Sheets

(51) Int. Cl.

| | |
|---|---|
| *G02B 30/56* | (2020.01) |
| *G02B 3/00* | (2006.01) |
| *G02B 17/08* | (2006.01) |
| *G02B 27/28* | (2006.01) |
| *G02B 27/10* | (2006.01) |
| *G02B 13/26* | (2006.01) |
| *G02B 17/00* | (2006.01) |

(52) U.S. Cl.
CPC .............. *G02B 5/13* (2013.01); *G02B 13/26* (2013.01); *G02B 17/002* (2013.01); *G02B 17/08* (2013.01); *G02B 17/0856* (2013.01); *G02B 27/01* (2013.01); *G02B 27/1066* (2013.01); *G02B 27/283* (2013.01); *G02B 30/56* (2020.01); *G02B 2027/0118* (2013.01); *G02B 2027/0145* (2013.01)

(58) Field of Classification Search
CPC ...... G02B 3/0062; G02B 3/0087; G02B 5/13; G02B 13/26; G02B 17/002; G02B 17/08; G02B 17/0856; G02B 2027/0118; G02B 2027/0145
USPC ....................................................... 359/662
See application file for complete search history.

(56) References Cited

U.S. PATENT DOCUMENTS

| | | | |
|---|---|---|---|
| 5,291,334 A | 3/1994 | Wirth et al. | |
| 5,463,498 A | 10/1995 | Gal et al. | |
| 5,579,161 A | 11/1996 | Sekiguchi | |
| 5,621,572 A | 4/1997 | Fergason | |
| 5,731,899 A | 3/1998 | Meyers | |
| 5,822,125 A | 10/1998 | Meyers | |
| 5,973,844 A | 10/1999 | Burger | |
| 6,124,974 A | 9/2000 | Burger | |
| 6,124,975 A | 9/2000 | Dona et al. | |
| 6,191,880 B1* | 2/2001 | Schuster | G02B 5/3083 359/237 |
| 6,317,037 B1 | 11/2001 | Ayres et al. | |
| 6,381,072 B1 | 4/2002 | Burger | |
| 6,384,981 B1* | 5/2002 | Hauschild | G02B 3/005 359/622 |
| 6,796,656 B1 | 9/2004 | Dadourian | |
| 6,842,297 B2 | 1/2005 | Dowski, Jr. | |
| 6,937,221 B2 | 8/2005 | Lippert et al. | |
| 7,042,645 B2 | 5/2006 | Houlihan et al. | |
| 7,116,405 B2 | 10/2006 | Johnson | |
| 7,186,004 B2 | 3/2007 | Powell et al. | |
| 7,274,808 B2 | 9/2007 | Baharav et al. | |
| 7,589,900 B1 | 9/2009 | Powell | |
| 7,764,429 B2 | 7/2010 | Nomura | |
| 7,839,573 B2 | 11/2010 | Wippermann et al. | |
| 7,956,924 B2 | 6/2011 | Georgiev | |
| 7,986,315 B2 | 7/2011 | Sprague et al. | |
| 8,085,218 B2 | 12/2011 | Heisch | |
| 8,120,858 B2 | 2/2012 | Choi et al. | |
| 8,299,980 B2 | 10/2012 | Takahashi et al. | |
| 8,622,549 B2 | 1/2014 | Linden et al. | |
| 8,670,171 B2 | 3/2014 | Martin et al. | |
| 8,711,466 B2 | 4/2014 | Kroll et al. | |
| 8,715,079 B1 | 5/2014 | Loose | |
| 8,867,136 B2 | 10/2014 | Hashikawa | |
| 9,030,503 B2 | 5/2015 | Moore | |
| 9,049,381 B2 | 6/2015 | Venkataraman et al. | |
| 9,426,455 B2 | 8/2016 | Horstmeyer et al. | |
| 2002/0034014 A1 | 3/2002 | Gretton et al. | |
| 2002/0176172 A1* | 11/2002 | Nemoto | B29C 65/562 359/619 |
| 2004/0013341 A1 | 1/2004 | Hall | |
| 2004/0156130 A1* | 8/2004 | Powell | G02B 3/0025 359/845 |
| 2005/0248849 A1 | 11/2005 | Hakan et al. | |
| 2006/0077319 A1 | 4/2006 | Kitamura | |
| 2006/0232747 A1 | 10/2006 | Thornton et al. | |
| 2007/0103747 A1 | 5/2007 | Powell et al. | |
| 2007/0159700 A1 | 7/2007 | Danner et al. | |
| 2008/0001850 A1 | 1/2008 | Champion et al. | |
| 2009/0115989 A1 | 5/2009 | Tanaka | |
| 2009/0168187 A1* | 7/2009 | Woodgate | G02B 3/0031 359/623 |
| 2009/0190098 A1 | 7/2009 | DeJong et al. | |
| 2009/0231698 A1 | 9/2009 | Hashimoto et al. | |
| 2009/0262182 A1 | 10/2009 | Javidi et al. | |
| 2010/0079861 A1 | 4/2010 | Powell | |
| 2010/0245345 A1 | 9/2010 | Tomisawa et al. | |
| 2010/0266268 A1* | 10/2010 | Jennings | B23K 26/0648 392/407 |
| 2010/0271290 A1 | 10/2010 | Tomisawa et al. | |
| 2010/0315597 A1 | 12/2010 | Powell et al. | |
| 2012/0105310 A1 | 5/2012 | Sverdrup et al. | |
| 2012/0300273 A1 | 11/2012 | Lin | |
| 2013/0003022 A1 | 1/2013 | Tanaka et al. | |
| 2013/0285885 A1 | 10/2013 | Nowatzyk et al. | |
| 2013/0341493 A1 | 12/2013 | Ando et al. | |
| 2014/0177022 A1* | 6/2014 | Saisho | G02B 26/101 359/205.1 |
| 2014/0376097 A1 | 12/2014 | Yamashita et al. | |
| 2015/0049383 A1 | 2/2015 | Janins et al. | |
| 2015/0145969 A1 | 5/2015 | Kim et al. | |
| 2015/0153551 A1* | 6/2015 | Kobori | G02B 17/002 359/534 |
| 2015/0241709 A1* | 8/2015 | Stelzer | G01J 1/4257 359/636 |
| 2017/0003448 A1 | 1/2017 | Marshall | |
| 2017/0105618 A1 | 4/2017 | Schmoll et al. | |
| 2017/0261748 A1 | 9/2017 | Powell | |

FOREIGN PATENT DOCUMENTS

| | | |
|---|---|---|
| EP | 1315019 A1 | 5/2003 |
| KR | 20090009588 A | 1/2009 |
| KR | 20140012396 A | 2/2014 |
| WO | 9938046 A1 | 7/1999 |
| WO | 2009044437 A1 | 4/2009 |
| WO | 2014048999 A1 | 4/2014 |
| WO | 2014133481 A1 | 9/2014 |

OTHER PUBLICATIONS

Yeom, et al., "Viewing window expansion in integral floating display using tilted side mirrors", In Proceedings of 3DTV Conference: The True Vision—Capture, Transmission and Display of 3D Video, May 16, 2011, 4 pages.

Yamamoto, et al., "Floating aerial LED signage based on aerial imaging by retro-reflection (AIRR)", In Proceedings of Optics Express vol. 22, Issue 22, Nov. 3, 2014, 6 pages.

"Anti-reflective glass (AR-Glass)", Retrieved on: Aug. 25, 2015 Available at: http://biz.everychina.com/shanghai_manbo-r/z6504064-ag_glass_anti_glare_glass.html.

U.S. Appl. No. 14/588,792, Powell, et al., "Retro-Imaging System Having High Efficiency Through Control of Polarization with Minimized Polarization-Filtering Induced Diffractive Artifacts Impacting Resolve", filed Jan. 2, 2015.

U.S. Appl. No. 14/538,783, Powell, et al., "High Accuracy Corner Cube Arrays for High Resolution Retroreflective Imaging Applications", filed Nov. 11, 2014.

Yamamoto, et al., "Design of crossed-mirror array to form floating 3D lens signs", In Proceedings of SPIE, Stereoscopic Displays and Applications XXIII, vol. 8288, Feb. 6, 2012.

Yamamoto, et al., "Aerial LED signage by use of crossed-mirror array", In Proceedings of SPIE, Advances in Display Technologies III, vol. 8643, Mar. 1, 2013.

Urey, et al., "Microlens array-based exit pupil expander for full-color display applications", in Proceedings of SPIE—the International Society for Optical Engineering, vol. 5456, Apr. 2004.

"Non Final Office Action Issued in U.S. Appl. No. 15/246,425", dated Oct. 10, 2017, 11 Pages.

(56) References Cited

OTHER PUBLICATIONS

"Notice of Allowance Issued in U.S. Appl. No. 15/246,425", dated Mar. 5, 2018, 11 Pages.
"Invitation to Pay Additional Fees Issued in PCT Application No. PCT/US17/020060", dated Jun. 2, 2017, 14 Pages.
Yamamoto et al., "Aerial 3D LED Display by Use of Retroreflective Sheeting", SPIE—IS&T Electronic Imaging, 2013, 8 pages, vol. 8648.
"Compact Microoptical Imaging System for Digital Close-Up Imaging", Retrieved on: Jun. 15, 2015, Available at:http://www.iof.fraunhofer.de/content/dam/of/en/documents/pb/Compact%20Microoptical%20Imaging%20System%20for%20Digital%20Close-Up%20Imaging.pdf.
"International Search Report & Written Opinion Issued in PCT Application No. PCT/US2017/020058", dated Jun. 1, 2017, 13 Pages.
"International Search Report & Written Opinion Issued in PCT Application No. PCT/US2017/020059", dated Jun. 1, 2017, 17 Pages.
"SELFOC® Lens Array", Retrieved on: Jun. 15, 2015, Available at: http://welcome.gofoton.com/product/lens_array/.
Aldalali, et al., "A micro camera utilizing a microlens array for multiple viewpoint imaging", In Proceedings of 16th International Solid-State Sensors, Actuators and Microsystems Conference, Jun. 5, 2011, 4 pages.
Brady, et al., "Multiscale lens design", In Proceedings of Optics Express, vol. 17, No. 13, Jun. 10, 2009, pp. 10659-10674.
Bruckner, et al., "Ultra Compact Close up Microoptical Imaging System", In Proceedings of Current Developments in Lens Design and Optical Engineering XI; and Advances in Thin Film Coatings VI, Aug. 19, 2010, 3 pages.
Hembd-Sölner, et al., "Imaging properties of the Gabor superlens", In Journal of Optics A: Pure and Applied Optics vol. 1 No. 1, Jan. 1991, 2 pages.
Lanman, et al., "Near-Eye Light Field Displays", ournal of ACM Transactions on Graphics, Nov. 2013, 10 pages, vol. 36, Issue 6.
Meyer, et al., "Optical Cluster Eye Fabricated on Wafer-Level", Optics Express, Aug. 22, 2011, pp. 17506-17519, vol. 19, Issue 18.
Mungan, C.E, "The Cat's Eye Retroreflector", Retrieved on: Dec. 7, 2015, Available at: http://www.usna.edu/Users/physics/mungan/_files/documents/Scholarship/Retroreflector.pdf.
Park, et al., "Compact Near-Eye Display System Using a Superlens-based Microlens Array Magnifier", IEEE 28th International Conference on Micro Electro Mechanical Systems, Jan. 18, 2015, pp. 952-955.
Rajasekharan, et al., "Analysis of an array of micro lenses using Fourier-transform method", In Proceedings of IET Optoelectronics, vol. 4, Issue 5, Oct. 2010, pp. 210-215.
Shaoulov, et al., "Compact Microlenslet-Array-Based Magnifier", Optics Letters, Apr. 1, 2004, pp. 709-711, vol. 29, Issue 7.
Spring et al., "Confocal Microscope Scanning Systems", Available at: http://www.olympusconfocal.com/theory/confocalscanningsystems.html.
Stollberg, et al., "The Gabor superlens as an alternative waferlevel camera approach inspired by superposition compound eyes of nocturnal insects", In Proceedings of Optics Express, vol. 17, Issue 18, Aug. 31, 2009, pp. 15747-15759.
Tsvetkov. A. D. "Catadioptric Retroreflector", In Journal of Optical Technology, vol. 78, Issue 3, Mar. 2011, 3 pages.
Wu et al., "100% Fill-Factor Aspheric Microlens Arrays (AMLA) With Sub-20-nm Precision", IEEE Photonics Technology Letters, Aug. 18, 2009, pp. 1535-1537, vol. 21, Issue 20.
"First Office Action and Search Report Issued Chinese Patent Application No. 201780016469.6", dated Jun. 27, 2019, 15 Pages.
"Office Action Issued in Chinese Patent Application No. 201780016469.6", dated Dec. 17, 2019, 7 Pages.

* cited by examiner

ARRAY-BASED FLOATING DISPLAY

CROSS-REFERENCE TO RELATED APPLICATION

This application claims the benefit of U.S. provisional application entitled "Array-Based Floating Display," filed Mar. 8, 2016, and assigned Ser. No. 62/305,512, the entire disclosure of which is hereby expressly incorporated by reference.

DESCRIPTION OF THE DRAWING FIGURES

For a more complete understanding of the disclosure, reference is made to the following detailed description and accompanying drawing figures, in which like reference numerals may be used to identify like elements in the figures.

Figure 1:
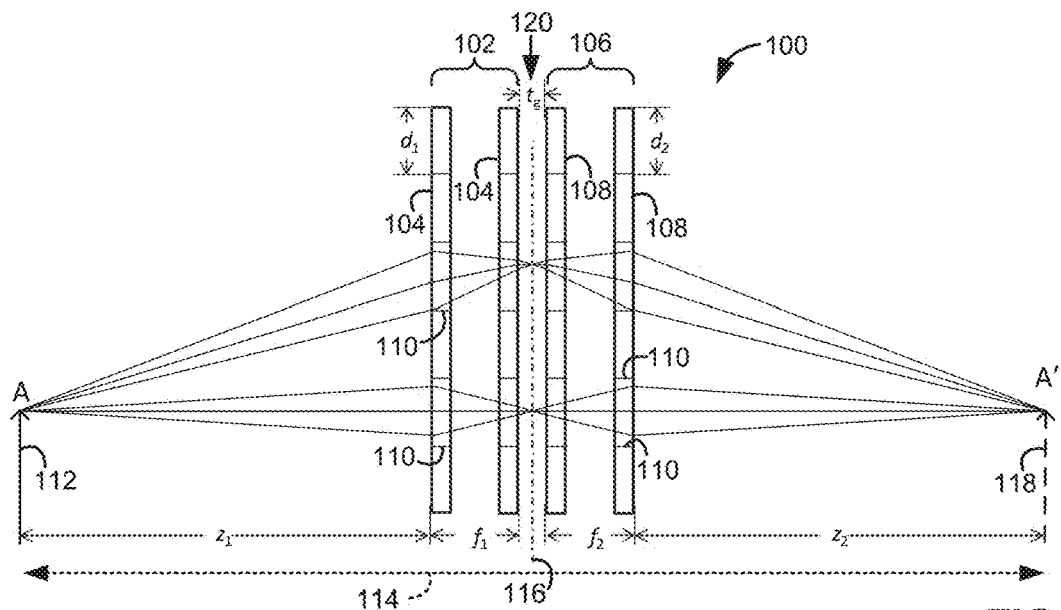
FIG. 1 is a schematic view of a lens system having two lens array assemblies with cells that exhibit Fourier transform lenses in accordance with one example.

The disclosed devices may assume various forms. Specific examples are illustrated in the drawing (and are hereafter described) with the understanding that the disclosure is intended to be illustrative, and is not intended to limit the invention to the specific examples described and illustrated herein.

DETAILED DESCRIPTION

Floating displays involve the transfer of light of an object to an image plane. Floating displays may be useful, for instance, in scenarios in which information or interaction with a user is provided while avoiding physical contact. Floating displays that rely upon retroreflective film in a double-pass beam splitter arrangement are often too bulky and inefficient. For example, a double-pass arrangement with a half mirror has inherent losses that arise with rejection and absorption at each reflection. A double-pass arrangement with a polarization splitter uses polarization to improve efficiency, but becomes polarization-sensitive. Retroreflective films also exhibit image breakup. For example, image breakup arises when using faceted type corner-cube array-based retroreflective sheets because lateral offsets of light rays may occur within each corner cube cell, as such sheets retroreflect via three reflections within a cell.

Lens systems providing floating displays via stacks or assemblies of lens arrays, such as microlens arrays (MLAs), are described. The MLAs of the stacks are assembled such that conelets of light are stitched into a complete numerical aperture (NA) without gapping. Erect, high efficiency imaging is achieved. The lens system includes an imaging core of two lens array assemblies. In some cases, each assembly includes a pair of in-tandem MLAs. The MLAs of each pair are, in turn, separated by the focal length of the constituent lenslets (e.g., array elements) of the MLAs. The MLAs may thus be disposed in a compact stack configuration.

The lens systems may accept diverging object light from object space on one side of the lens system, and reconverge that light to form an image of the object in image space on the opposing side of the lens system, forming an erect and real image. Reconvergence is achieved by an inversion property of the lens systems, such that light having an angle of incidence (AOI) biased laterally in one direction is redirected by the lens system in the opposing direction, such that (i) input rays are flipped in direction from normal upon exit, and (ii) divergent light cones into the lens system may be re-converged by the lens system toward an image on the opposing side of the lens system.

The focal length separation of the two in-tandem pairs leads to high efficiency imaging. Each in-tandem pair implements a full, true Fourier transform between position space and angle space (or spatial frequency space). A transformation into angle space is provided by the first pair at an intermediate transform plane between the two pairs. The second pair then implements a second transformation from angle space back to position space to provide the erect image at an image distance determined as a function of (i) the focal lengths of the MLAs, (ii) the pitches of the MLAs, and (iii) the distance between the two pairs, for a given object distance. The function may thus be used to configure the lens system arrangement to form the image at a desired image distance. As described herein, formation of a real, non-inverted image is provided by satisfying the following two constraints: (1) providing consistent imaging conjugate distances within an array element, and (2) convergence of image content across multiple imaging elements within the array.

Implementing a full Fourier transform avoids losses and other distortions by addressing the diffraction arising in connection with each MLA. Without the second MLA for each cell, the transform appears to be a Fourier Transform (FT) in intensity, but not in phase, as a quadratic phase error remains. Phase correction is provided by the second MLA of each pair, which effectively provides telecentric correction of the output. The inner array of each in-tandem FT MLA pair prevents loss and scatter of light having higher spatial frequency content, or light having higher angle of incidence, at the intermediate transform plane. Without phase correction at these inner arrays, a portion of light involved in fully resolving the object (within the diffraction limit defined by lenslet acceptance numerical aperture NA) would be lost. By making use of in-tandem FT MLA pairs, apodization is accordingly avoided, thereby reducing diffractive artifacts and minimizing loss of system resolve or loss of optical performance, such as Modulation Transfer Function (MTF). The fully formed diffraction output of the first in-tandem pair is then fully utilized by the second in-tandem pair to instead improve the efficiency of the lens system and, thus, image quality. Clipping and vignetting are also avoided via the phase correction. The MLA-based lens system is instead capable of stitching conelets of light into a complete numerical aperture (NA) without angular gaps.

Higher efficiencies may also be attained due to a higher fill factor of the MLAs. Some microlens arrays are capable of being molded with 100% fill factor. For example, microlens arrays formed by replication using an etched master, by molding using a master that was fabricated using diamond machining as part of the mastering process, or by direct diamond machining, may achieve 100% fill factor, while microlens arrays formed by photoresist reflow will have flat gaps between lenslets, and microlens arrays formed by grey-scale lithography may exhibit rounded seams at the edges of each lenslet causing scatter. Other solutions, such as GRIN rod arrays, have a 10% loss in fill factor arising from hexagonal packing of round rods. Further, arrays of round lenses have similar gaps in fill factor. By making use of high fill factor types of MLAs or GRIN fiber faceplates from boules (or preforms), or arrays of lenses, such as miniature or micro-lenses or GRIN lenses, each having a shape suitable for tiling, including hexagonal, rectangular and square shapes, high efficiency may be maintained. MLAs may utilize aperture array masking at any plane within the stack to help reduce scatter of input light higher than the acceptance of each lenslet, while EMA absorbing glass or fiber may be utilized periodically within a GRIN fiber array to reduce such scatter.

The arrangement of the MLA pairs provides output without a tiling effect, the so-called lensitization arising from lens system acceptance and pointing angle. The tiling effect is avoided without having to resort to extensive increases in overall system length. The lens systems may therefore be provided in a compact, or thin, form factor (e.g., a stack of sheets or thin films) appropriate for electronic devices, such as phones, tablets, laptops, and other devices having a thin profile for portability and/or other reasons.

The lens systems are scalable without increases in system volume. The lens systems are capable of being scaled to handle larger lateral areas without any increase in track length. The thickness of the lens system thus does not increase. The lens systems may also be scaled to accommodate different object conjugate distances without significant increases in volume. Such scaling may also be useful in connection with imaging at short conjugate lengths. For instance, total conjugate lengths on the order of a few millimeters are achievable.

The two in-tandem MLA pairs of the lens systems may be arranged to provide unity or non-unity magnification. Various parameters and characteristics of the lens systems may differ in non-unity magnification examples, such the respective focal lengths of the MLA pairs, the respective pitches of the MLA pairs, and a gap between the MLA pairs.

In some cases, the lens systems are configured as reconvergent sheets. One application of a reconvergent sheet is a floating display, in which a real image appears to float, e.g., in mid-air in front of the viewer. The lens systems create the floating image with high efficiency, while being both wavelength and polarization independent.

The reconvergent sheet may be incorporated into a transmissive or reflective system. For instance, transmissive floating displays may include a sheet stack having a pair of in-tandem Fourier Transform corrected sets of microlens arrays (MLA). Object content at a distance behind sheet diverges toward the sheet, then is reconverged on the opposing side of the sheet at a distance in front of the sheet that, in some cases, is substantially similar to the distance of the object behind the sheet. The sheet may be quite efficient as described herein, limited only by Fresnel surface reflections, which may be reduced further by use of anti-reflection (AR) coatings. Because the sheet maintains polarization, any given or random polarization may be used without decreasing efficiency. The sheet avoids image breakup and may be optimized for best focus.

The transmissive sheets described herein enable high quality, high efficiency plane to plane imaging or transfer of 2D/3D objects, without the need to rely on polarization control or double-pass setups to reveal the floating image, thereby substantially simplifying system setup relative to other floating displays. The lens systems used to provide floating displays may be curved in some cases, notwithstanding the plane-to-plane reconvergence provided by the lens array assemblies of the lens systems.

The reflective floating displays include a reflective sheet stack. With the reflective sheet, object content at a distance diverges toward the sheet, and is reflected and reconverged at a distance in front of the stack, which may be substantially similar to the distance of the object before the sheet.

The reflective sheet stacks described herein utilize the fold symmetry of the transmissive reconvergent sheets. For instance, the reflective sheets may use a single in-tandem tandem Fourier Transform corrected set of microlens arrays in conjunction with a reflector, or mirror layer. A reflective sheet having reconvergent properties is thus provided. In some cases, the reflective sheets include: (1) a first microlens layer, (2) a second in-tandem microlens layer placed substantially close to focal length distance from first, and (3) a reflective layer placed at an intermediate plane, defined by a gap, to provide high quality focused, reconvergent imaging.

The reflective sheet stacks may be used in a beam splitter configuration. In such cases, the reflective sheet stack acts as a retro-reflective sheet. Alternatively, the reflective sheet stacks are used in a hopping configuration, in which case the reflective sheet acts as a reconvergent sheet. The sheet may be considered reconvergent (e.g., in contrast to 'retro-reflective' alone), because the sheet may be used as a retro-reflector sheet in a double-pass folded system (e.g., the beam splitter configuration) and as a floating display without the folded system via, for instance, a 'hopping' technique described herein.

The array-based sheets may be incorporated into other reflective scenarios, such as a conspicuity film or a retroreflective film. In those cases, the array-based sheets act as a retroflector, but without reconvergence of the object light. To that end, the arrays may be arranged to allow a desired level of defocusing of the light upon reflection. For instance, the distance between the arrays may be adjusted from the Fourier configuration that supports reconvergence. The adjustments may be made by design such that the retroreflected angular subtend, e.g., from a road sign, may be large enough for a driver in an automobile to see the retroreflection of the light emanating from the headlights of the automobile illuminating the road sign, which may be only a degree to a few degrees. In contrast, in an imaging configuration, the lens system may maintain a tighter (e.g., much tighter) retroreflected angular subtend, such as less than 0.1 degrees, or even less than 0.02 degrees.

The lens systems are not limited to particular types of MLA-based array assemblies. Other types of lensing structures and arrays may be used for each one of the lens array assemblies. For instance, each lens array assembly may include an array of GRIN microlensing structures. Each GRIN microlensing structure of the array then corresponds with a respective one of the cells of each lens array assembly. As used herein, the term "cell" is used to refer to a unit of each array assembly. Because, in some cases, an array assembly includes a pair of arrays, a cell may include an FT pair of array elements, one from each array. In other cases (e.g., GRIN cases), a cell corresponds with a single element of the array that provides the equivalent of an FT lensing pair. A GRIN lens length may be stated in terms of optical pitch p, which corresponds to fractions of sinusoidal-like divergence and convergence from defocus and toward focus in a cyclic fashion, and a length of 0.25p represents a lens z length that may collimate an input point source or vice versa focus a collimated input beam. The pitch of a GRIN lens is referred to as the spatial frequency of ray trajectory, or an optical length representing one cycle of the sinusoidal-like wave of convergence and divergence to and from focus, thus, a GRIN lens having pitch 0.25p, or ¼ pitch, corresponds closely to an FT equivalent length. In such cases, two arrays of GRIN lenses, which each have an optical length of pitch 0.25p, may be used to form an array-based imaging system.

FIG. 1 is a schematic view of a lens system 100 configured to operate as a transmissive floating display. The lens system 100 includes two lens array assemblies. In this example, one assembly of the lens array assemblies of the lens system 100 includes a first pair 102 of in-tandem microlens arrays 104. The other assembly of the lens array assemblies 100 includes a second pair 106 of in-tandem microlens arrays 108. Each lens array assembly has a plurality of cells. As described below, each cell is configured to exhibit a pair of Fourier transform lenses. In this example, each microlens array 104, 108 includes a respective set of constituent lenslets 110, respective pairs of which make up each cell of the lens array assemblies.

Light from an object 112 diffuses as it approaches the lens system 100. The object 112 is separated from the lens system 100 by an object distance $z_1$. A few example rays of light are shown in FIG. 1. The example rays propagate from a point A on the object 112 toward the first pair 102 of arrays 104. In many cases, light from the object 112 encounters each of the lenslets 110 to the extent permitted by the numerical aperture, or acceptance cone, of the microlens array 104.

The microlens arrays 104, 108 of the two array pairs 102, 106 are positioned to achieve reconvergent imaging. Each array 104, 108 is generally disposed, or oriented, along a respective plane, as shown in FIG. 1. The respective planes and, thus, the arrays 104, 108 are separated from one another along an optical axis 114. The arrays 104 of the first pair 102 are spaced from one another by a distance $f_1$. The arrays 108 of the second pair 106 are spaced from one another by a distance $f_2$. The array pairs 102, 106 are spaced from one another by a distance $t_g$ (or D). Each distance is an effective optical distance determined in accordance with the refractive index of the medium through which light passes when transmitted over the particular distance. Each distance is selected in accordance with a function that establishes the image conjugate distance for the imaging of the lens system 100. The image conjugate distance is establishing by satisfying the constraints of (1) providing imaging conjugate distances along the optical path within a given lenslet, or thus within a two in-tandem lenslet imaging cell, as well as (2) convergence of image content across multiple imaging cells within the assembly, thereby enabling formation of a real, non-inverted image.

The distances $f_1$ and $f_2$ are set in accordance with the focal lengths for the cells, e.g., the lenslets 110 of the arrays 104, 108. The distance $f_1$ is the common focal length of the cells of the first lens array assembly, e.g., the lenslets 110 of the arrays 104. The distance $f_2$ is the common focal length of the cells of the second lens array assembly, e.g., the lenslets 110 of the arrays 108. The distances $f_1$ and $f_2$ are both effective focal lengths of the cells, and account for the refractive indices of optical media used in the system, including any substrate, microlens, and fill materials between the arrays 104, 108, as well as fill material disposed in the optical path defined by the gap $t_g$, which may include air or various other optical media.

The focal length separation of each array 104 of the pair 102 establishes that the array pair 102 implements a Fourier transform of the light emanating from the object 112. For objects at an infinite distance from the first array pair 102, $t_g$ is zero (or substantially near zero) and the Fourier transform is a phase-corrected Fourier transform from the angle space of the light emanating from the object 112 into position space (or spatial frequency space), as explained herein. The array pair 102 provides a representation of the phase-corrected Fourier transform along a plane 116 disposed between the array pairs 102, 106. The plane 116 is accordingly referenced as an intermediate transform plane. For closer object distances, the distance $t_g$ increases, such that the intermediate transform plane 116 exists at a finite distance from and between the arrays 104 and 108. As described below, for a given lenslet design, the distance or optical gap $t_g$ follows a mathematical relationship dependent on object distance along with other lenslet parameters. A stack having a fixed $t_g$ may function reasonably well over a limited range of object distances in proximity to the design object distance.

Use of two-lens in-tandem Fourier transform MLA pairs enables higher spatial frequency content (corresponding to higher angle light) to transmit into the intermediate transform plane without clipping. Such transmission, in turn, allows formation of a Sinc-like function that is more highly resolved, containing higher spatial frequency content, and limited primarily only by MLA acceptance numerical aperture (NA). This in turn allows the converging conelets out of each cell to be stitched forming a core NA without angular gaps within the solid angle of the NA. Impact on the Fourier transform due to lenslet sag profile may be reduced by using aspheric lenslet profiles, such as a conic constant in a range from about k=−0.25 to about k=−0.4, or other aspheric profiles.

The focal length separation of each array 108 of the pair 106 establishes that the array pair 106 implements a Fourier transform of the light associated with the representation at the intermediate transform plane 116. The Fourier transform is again a phase-corrected transform. The array pair 106 transforms the representation at the intermediate transform plane 116 from position space back into angle space, as well as focus convergence toward the image conjugate distance $z_2$.

The two array pairs 102, 106 are positioned relative to one another along the optical axis 114 to establish that the lens system 100 is an imaging system. That is, the distance D between the two array pairs 102, 106 establishes that the lens system 100 provides an erect image 118 of the object 112. The image 118 is provided at an image conjugate distance $z_2$ from the array pair 108.

The image conjugate distance $z_2$ is established via a function of the object conjugate distance $z_1$ for the object 112, the distance D between the array pairs 102, 106, a first pitch of the first array pair 102, a second pitch of the second array pair 106, and the common focal lengths $f_1$, $f_2$. The function establishes that the light emanating from the object 112 and passing through the constituent lenslets of the in-tandem microlens arrays of the array pairs 102, 106 converges at the image conjugate distance $z_2$. Further details regarding the function are provided hereinbelow in connection with parameters identified in FIG. 1.

For two lenses in tandem, $f_{1a}$ and $f_{1b}$, separated by distance D, the distance s, after the last lens at which an image of the input object 112, at distance $z_o$ before the first lens, occurs may be defined as $$s_i = \frac{f_{1b}(D(f_{1a}-z_o)+f_{1a}z_o)}{D(f_{1a}-z_o)+f_{1b}z_o+f_{1a}(z_o-f_{1b})}$$

However, when focal lengths $f_{1a}$ and $f_{1b}$ are configured as a Fourier Transform pair, such that $f_{1a}=f_{1b}=f_1$ and separation distance $D=f_{1a}=f_1$, then the image distance of input object A, occurs at distance s, after the last lens, which simplifies to $z_{g1}$:

$$z_{g1} = \frac{f_1(f_1(f_1-z_o)+f_1 z_o)}{f_1(f_1-z_o)+f_1 z_o+f_1(z_o-f_1)} = \frac{f_1^2}{z_o}$$

where $f_1$ is the focal length of each lens of the two-lens in-tandem Fourier transform pair and $z_o$ is the object distance before the first lens.

The foregoing relationship may then be extended to the array context. An array of lenslets, or cells, are formed by pitch d. A portion of light diverging from the object 112 is captured by each cell. Each cell in one array forms a two-lenslet subsystem with a cell in the other array of an array pair. For a solid angle of light from the object 112 that overfills a cell of width near pitch d, the input captured is approximately a Rect function which forms a Sinc-like function near the image of A at the intermediate transform plane defined by, or disposed at, the distance $z_{g1}$ from the second array in the array pair.

The second Fourier transform array pair 106 is placed after the first array pair 102 at gap distance optically equivalent to $t_g = 2 \ast z_{g1}$. This configuration provides a 1:1 imaging relay and, thus, becomes symmetric. The imaging conjugate distances provided by each subsystem are the same. The images developed by all of the subsystems converge for image formation of the object 112, at distance $z_i$, to form image 118 (see, e.g., point A' corresponding to point A on the object 112). In such cases, the lens system 100 becomes a 1:1 system such that the image conjugate distance $z_i$ is equal, or substantially equal, to the object conjugate distance $z_o$.

The intermediate images may be referred to as intermediate transform images of the input object 112, which occur at the intermediate transform plane near half the gap $t_g$, defined previously as distance $z_{g1}$.

The distance, or gap $t_g$, between the two array pairs 102, 106 is determinative of the imaging of a stack of cells. The cell stack includes four cells, one from each array 104, 108. Each cell stack may be considered a constituent sub-system of the lens system 100. The distance between the two array pairs 102, 106 is selected such that imaging is achieved for all rays entering the constituent sub-system at a common image conjugate distance. The distance, or gap $t_g$, increases as the object distance decreases (i.e., the object 112 becoming closer to the lens system 100). The distance, or gap $t_g$, goes to zero as the object distance goes to infinity (or very large distances relative to the dimensions of the lens system 100). In the example of FIG. 1, the two array pairs 102, 106 are spaced apart from one another by a gap 120. The distance, or gap $t_g$, for the function is thus non-zero. The gap 120 may be on an order of, or in the proximity of, the first and second common focal lengths.

The pitch of the lenslets 110 within the arrays 104, 108 governs the convergence of light from all of the lenslets 110. The lenslets 110 of the first array pair 102 have a pitch $d_1$, while the lenslets 110 of the second array pair 106 have a pitch $d_2$. The pitch is selected such that convergence of all optical information across all lenslets 110 of the arrays 104, 108 is achieved. An image is thus formed at the same image conjugate distance across all lenslets 110 of the array 104, 108. The lens system 100 is an example of a floating display in which the lenslets 110 of both array pairs 102, 106 have a common pitch. With the pitches $d_1$, $d_2$ equal to one another, the output of the lens system 100 may be telecentric.

Telecentric output may also be provided, on one side of the optical stack, in non-equal pitch cases, i.e., when $d_1$ does not equal $d_2$. In such cases, the pitches of the lenslets 110 in each array 104 of the first array pair 102 are equal to one another, and the pitches of the lenslets 110 in each array 108 of the second array pair 106 are equal to one another. The function simplifies as follows:

$$d_2 = \frac{d_1 z_2 (f_1 + z_1)}{(f_1 + z_2) z_1}$$

The gap $t_g$ is as follows:

$$t_g = z_{g1} + z_{g2},$$

where $$z_{g1} = \frac{f_1^2}{z_1} \text{ and } z_{g2} = \frac{f_2^2}{z_2}.$$

In such case, the pitches are configured such that $d_1=d_{1b}<d_{2b}=d_2$.

Non-telecentric imaging, on both sides of the optical stack, may also be provided. The rays may be smoothly bent through the lens system 100 by adjusting the respective pitches of the cells within the arrays 104, 108. The lenslets 110 of the arrays 104, 108 may thus be registered (or aligned) with one another or non-registered. In one example, the pitches of all four arrays differ from one another. The pitch $d_1$ for the lenslets 110 becomes $d_{1a}$ and $d_{1b}$ for the first and second arrays 104 of the first array pair 102. The pitch $d_2$ for the lenslets 110 becomes $d_{2a}$ and $d_{2b}$ for the first and second arrays 108 of the second array pair 106. In one positive magnification case, $d_{2b}>d_{2a}>d_{1b}>d_{1a}$. The function then may be expressed as follows (with $z_{g1}$ and $Z_{g2}$ defined as set forth above):

$$d_2 = \frac{d_{2b}f_2 z_1 + d_{1b}f_1 z_2 + d_1 z_1 z_2}{z_1(2f_2 + z_2)}$$

In such case, the pitches are configured such that $d_1<d_{1b}<d_{2b}<d_2$.

As shown by the examples described above, the gap $t_g$ is determinative of the imaging of each subsystem of cells, while the relative pitches of the arrays govern the convergence from all the cell subsystems.

The focal lengths of the cells within the arrays 104, 108 may also be used to adjust the image conjugate distance. Non-unity conjugate distances may be achieved when the focal lengths of the lenslets 110 within the arrays 104 are not equal to the focal lengths of the lenslets 110 within the arrays 108. In the example of FIG. 1, the focal lengths of the lenslets 110 within the arrays 104 and 108 are equal to one another.

The term "equal" is used herein to mean exactly equal and effectively equal. Effectively equal may include, for instance, parameters that are equal within a reasonable margin of error, such as a manufacturing tolerance. The parameter values thus need not be exactly equal (e.g., slightly offset) to be considered "equal" as that term is used herein. Any of the parameters described herein as equal in some examples may alternatively be "substantially equal" in other cases. Substantially equal parameter values may be intentionally or unintentionally offset by a slight amount that results in a discernable (e.g., detectable), but insignificant, effect on system output. Any of the parameters described herein as equal in some examples may alternatively be "about equal" in other cases. About equal parameter values may be intentionally or unintentionally offset by a slight amount that results in a discernable (e.g., detectable) effect on system output that may be considered significant in some applications but insignificant in other applications. For example, a slight de-focusing of system output resulting from about equal parameters may be significant in the context of a fingerprint reader, a microscope, or photolithography, but insignificant in the context of a printer or facsimile machine.

Distances referenced herein, such as the width of the gap 120, may differ in practice in accordance with the refractive index of the transmission medium. For example, the above-described functions specify a distance for the gap parameter in connection with transmission through an air gap. The actual width of the gap 120 may differ from the air gap distance if the light is propagating through a medium other than air when traversing the gap 120. The gaps and other distances may thus be optically equivalent distances. In cases using an optical medium other than air, the inner lenslet focal lengths may be adjusted to account for change in curvature required to maintain the Fourier Transform function of each pair. Increase in refractive index in the gap implies smaller lenslet curvature to maintain substantially equal effective focal length for an in-tandem MLA pair. Further, such practice is useful when it is desired to laminate both MLA pairs to form an optical stack that includes a monolithic optical stack without an air gap.

Optical terms such as "collimated", "focused", etc., are used herein to include both the exact condition described by the term as well as conditions near the exact condition. For example, light is considered to be collimated if the light rays are collimated to an effective extent for purposes of the imaging application or usage scenario involved. The resolution of the viewer may thus be taken into account when evaluating whether the optical condition (e.g., collimated, focused) is present.

Figure 2:
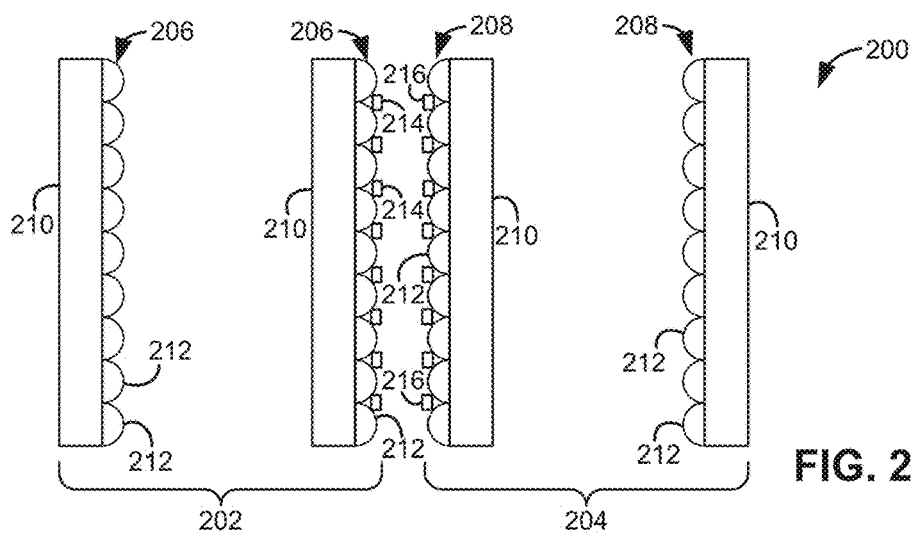
FIG. 2 is a schematic, side view of the lens system of FIG. 1 in accordance with an example having a respective in-tandem pair of microlens arrays (MLAs) for each lens array assembly.

FIG. 2 depicts a side view of a MLA-based lens system 200 in accordance with one example. As in the examples described above, the lens system 200 includes two array pairs 202, 204. The array pair 202 includes arrays 206, and the array pair 204 includes arrays 208. In this example, each array 206, 208 is disposed on a respective substrate 210. The substrates 210 may or may not be similarly configured and constructed. In one example, each substrate 210 is composed of a glass substrate having a thin microlens layer replicated on one surface using UV-cure adhesive resin, which may be cured using ultraviolet light, and a mold master, and each substrate 210 may have a similar thickness.

Each array 206, 208 includes a set of lenslets 212. In one example, each substrate 210 and set of lenslets 212 is integrally formed via injection molding. Alternatively, the lenslets 212 may be formed separately from the substrate 210 and affixed or otherwise secured thereto. For example, the lenslets 212 may be formed, and then applied to the substrates 210 with optically clear adhesive. The pitch and focal length of the lenslets 212 may be equal or offset as described above. Other techniques for forming the lenslets 212 may be used.

Surfaces may be optically coated with anti-reflective (AR) coatings to minimize loss and scatter due to Fresnel reflections. In cases using UV-cure adhesives, a glass master may be utilized to minimize distortion. Other examples include injection molding in a homogenous polymer, such as acrylic or polycarbonate, compression molding of polymer sheets, and nanoprinting. For compression molding, a nickel shim may be formed of a master negative using an electroform nickel process. A master may also be formed using diamond machining, such as plunge cutting a rotating cutter having a profile form for each lenslet, or diamond turning each lenslet. For high accuracy and fill factor, a lithography based glass etching technique may be used to fabricate the MLA master.

Various profiles may be used for each lenslet 212. For example, the lenslets 212 may have aspheric or conic profiles. The extent or degree to which the profiles are aspheric or conic may vary. In some cases, the lenslets 212 may have profiles with conic constants directed to reducing aberrations and/or allow the lens system to accommodate higher numerical apertures (NA). For example, a strong conic constant, such as $k=-0.7$ to $k=-1.0$, in one or more of the profiles is capable of improving focus on-axis, thereby enabling formation of higher spatial frequency content for more central fields, while a moderate conic constant, such as $k=-0.25$ to $k=-0.4$, may provide improve focus for a wide range of field locations. However, other aspheric profiles, not necessarily defined by a simple conic constant, may be used to improve imaging performance of the floating image.

The arrays 206, 208 are oriented symmetrically about the intermediate transform plane (FIG. 1). Each lenslet 212 of the arrays 206, 208 is a plano-convex structure. The planar side of each structure is adjacent the respective substrate 210. The curved side of each structure is disposed on an inward facing side of each array 206, 208 in the example of FIG. 2. The orientation of the lenslets 212 may vary from the example shown. One example is described below in connection with FIG. 3.

The lenslets 212 may be arranged in a variety of two-dimensional patterns. For example, the lenslets 212 may be disposed in a hexagonal array, a square array, or other arrangement. The lateral shape of each lenslet 212 may vary accordingly.

One or more of the arrays 206, 208 may be pattern or aperture masked. The aperture masking may be directed to limiting the acceptance of the lens system and/or reducing scattered light. Pattern masking may be directed to blocking ambient or other spurious light from being processed by the lens system 200. For instance, ambient light at high angles of incidence upon the lens system 200 is blocked. Blocking the high angle incident light may prevent the spurious light from hopping to a neighboring subsystem of cells. In the example of FIG. 2, the lens system 200 includes aperture stops 214 along the inner array 206 of the first array pair 202, as well as aperture stops 216 along the inner array 208 of the second array pair 204. Fewer, additional, or alternative aperture stops 214, 216 may be provided. For example, other lens systems may not include the aperture stops 216. Aperture stops may be disposed at any one or more of the layers.

The aperture stops may be provided for other purposes. For example, the aperture stops may address aberrations in the lenslets of the arrays.

Aperture masking may be accomplished by using a lithographed aperture hole array layer, such as patterned deposited thin metal oxide or metal, on top of or underneath the replicated layer as by replicating over an aperture-patterned substrate surface, or one or more patterned sheets disposed within the optical stack, e.g., near the inner arrays.

The aperture stops 214, 216 may be provided via a discrete sheet or other layer disposed along the respective array 206, 208. For example, an opaque sheet secured to, or disposed along, the array 206 may include an array of apertures to define the aperture stops 214. Alternatively or additionally, the pattern masking may be provided via a layer deposited or otherwise formed on the respective substrate 210. The layer may be patterned to define the aperture stops 214, 216 before the formation of the lenslets 212.

The aperture stops 214, 216 may be embedded in, or otherwise integrated with, the lenslets 212. For instance, the material of each aperture stop 214, 216 may be deposited on the substrate 210 and then patterned before and/or in connection with the formation of the lenslets 212. Further, a perforated or 'honeycomb' sheet of limited thickness may be disposed between the pairs.

Figure 3:
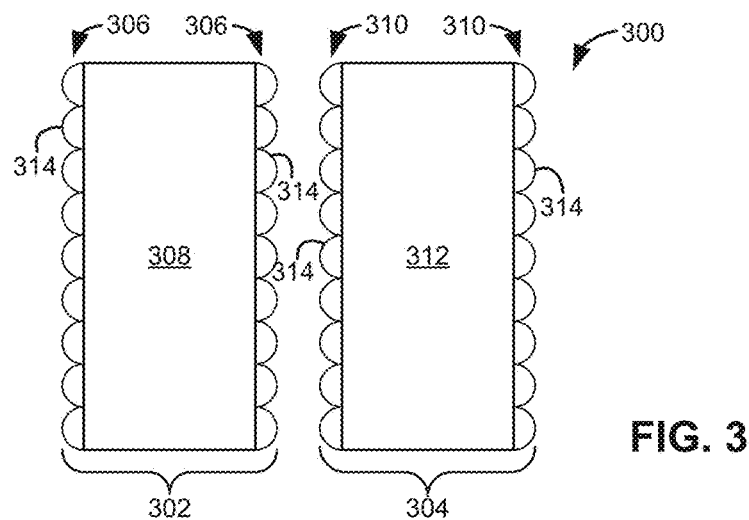
FIG. 3 is a schematic, side view of a MLA-based lens system in accordance with another example.

FIG. 3 depicts another example lens system 300 having array pairs 302, 304. In this case, arrays 306 of the pair 302 are disposed on opposite sides of a substrate 308. Arrays 310 of the pair 304 are disposed on opposite sides of another substrate 312. Each array 306, 310 includes lenslets 314, each of which includes a plano-convex structure. The curved surface of each lenslet 314 faces inward or outward in accordance with the side of the substrate 308, 312 on which the lenslet 314 is disposed.

The lenslets 314 may be arranged, shaped, formed, and otherwise configured as described above. The lens system 300 may have alternative or additional aspects in common with the examples described above. For example, in some cases, the lens system 300 includes aperture stops on one or more of the arrays 306, 310.

The arrays of the examples of FIGS. 2 and 3 may be separated from one another by air. Other media may be used. For example, low refractive index adhesive or laminate materials may be disposed between the arrays.

Figure 9:
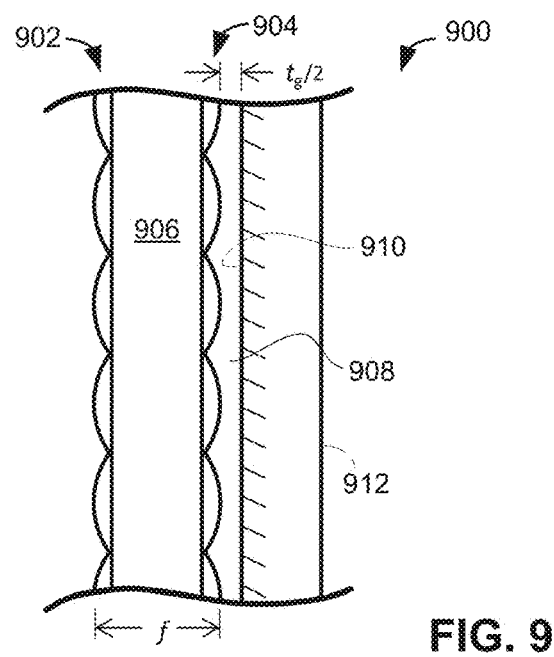
FIG. 9 is a schematic, side view of a lens system for a reflective floating display in which a pair of MLAs are disposed on opposing sides of a substrate in accordance with an example.
Figure 10:
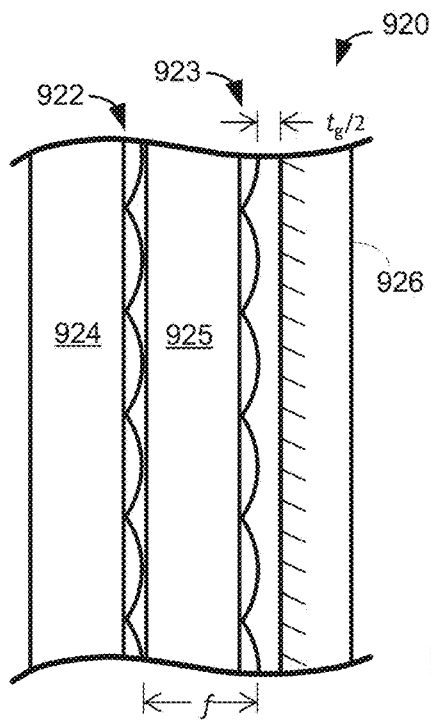
FIGS. 10 and 11 are schematic, side views of lens systems for a reflective floating display in which a pair of MLAs are disposed on respective substrates in accordance with an example.
Figure 11:
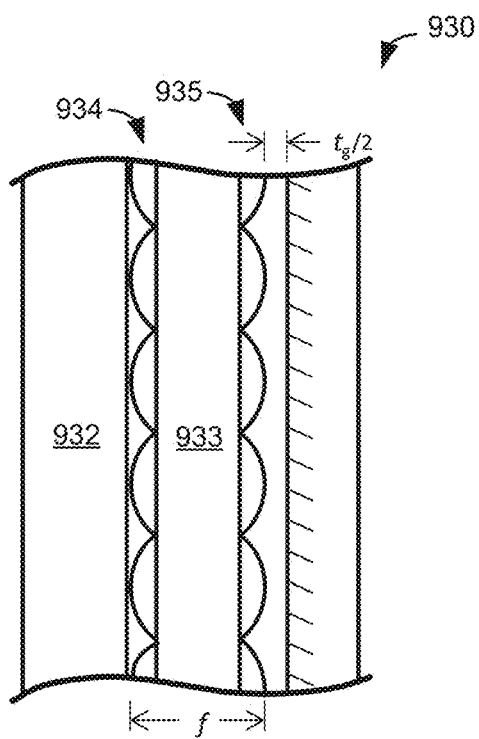

Lenslet orientations other than those shown in FIGS. 2 and 3 may be used. Further examples are shown in FIGS. 9-11.

The lens systems may differ from the examples of FIGS. 2 and 3 in other ways. For example, the arrays of each pair may be in contact with one another. In four-substrate cases, the arrays may be in contact as a result of the thickness of the inner substrates.

Additional substrates or other structures may be used in other examples. For example, two substrates may be disposed before and after the array assemblies of FIG. 3 to provide, for instance, additional structural support or protection.

A four layer MLA stack may be configured to accommodate conjugate distances from infinity to close proximity. However, the gap distance $t_g$ may increase substantially for object distances approaching the focal length of the first array. In such cases, additional, outer MLAs may be added in order to enable the inner gap distance to be substantially reduced, and further provide a focus NA having no angular gaps (or substantially reduced angular gaps). Further, the outer MLAs may provide added freedom in design as each surface profile may be tailored to improve optical performance.

Figure 4:
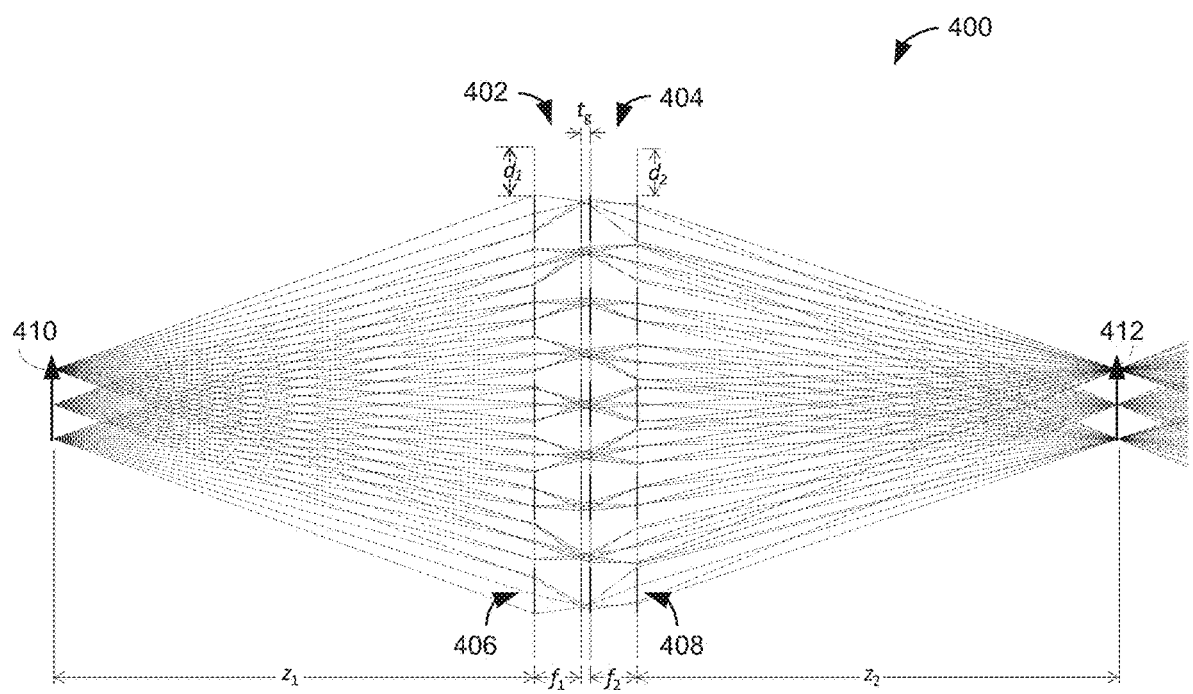
FIG. 4 is a ray trace diagram for a transmissive floating display having a lens system with two lens array assemblies in accordance with one example.

FIG. 4 is a ray tracing diagram to provide a paraxial illustration for a four-layer lens system 400 that may be used as, for instance, a transmissive reconvergent sheet for a high quality floating display. The pitch, focal length, and conjugate distance parameters of the lens system may be selected in accordance with the function described above to achieve, for instance, 1:1 reconvergent imaging. Plane-to-plane imaging for the floating display is provided by two lens array assemblies 402, 404. Each lens array assembly 402, 404 includes a respective plurality of cells 406, 408. Each cell 406, 408 is depicted schematically as a pair of vertical line segments. Each cell 406, 408 is configured to exhibit a pair of Fourier transform lenses. Each line segment may thus be considered to correspond with a respective one of the Fourier transform lenses. In some cases, each cell includes a respective lenslet from two sets of constituent lenslets of a microlens array. In other cases, each cell includes a single structure (e.g., a GRIN element) that acts as both Fourier transform lenses.

The lens array assemblies 402, 404 are positioned relative to one another along the optical axis of the lens system 400 such that light diverging from an object 410 at a plane disposed at an object conjugate distance $z_1$ from the lens array assembly 402 reconverges at an image plane 412 after passing through the lens array assemblies 402, 404. A floating image can accordingly be observed by a viewer's eye disposed beyond the image plane 412 (e.g., to the right of the image plane 412). The image plane 412 may accordingly be considered to represent a floating image plane. The image plane 412 is disposed at an image conjugate distance $Z_2$ from the lens array assembly 404. The image conjugate distance $Z_2$ is established in accordance with the object conjugate distance. For instance, the lens array assemblies 402, 404 may be configured such that the image conjugate distance $z_2$ equals or substantially equals the object conjugate distance $z_1$. As described above, the image conjugate distance $z_2$ is established via a function of the object conjugate distance $z_1$, a distance or gap between the first and second lens array assemblies $t_g$, a first focal length $f_1$ of the first plurality of cells 406, a second focal length $f_2$ of the second plurality of cells 408, a first pitch of the first plurality of cells 406, and a second pitch of the second plurality of cells 408. The function also establishes that the light diverging from the object 410 converges (or reconverges) at the image conjugate distance $z_2$.

In the example of FIG. 4, the plane of the object 410 and the image plane 412 are oriented in parallel and orthogonally to the optical axis of the lens system 400. In other cases, the plane of the object 410 and the image plane 412 are oriented orthogonally to a line oriented at an angle to the optical axis of the lens system, examples of which are described and shown in connection with FIGS. 16 and 17.

The focal lengths of the cells 406, 408 may or may not be equal to one another. In cases in which the cells 406, 408 have a common focal length, unity magnification may be provided by configuring the assemblies 402, 404 with a common pitch. Non0unity magnification may be provided via different focal lengths and/or different pitches between the lens array assemblies 402, 404.

In some cases, the object 410 is a display, e.g., an emissive display, such as an organic light emitting diode (OLED) display. Any other type of emissive display may be used. The object 410 is not limited to display or other two-dimensional objects. For instance, the object 410 may be a three-dimensional scene. The lens system 400 may be configured to reconverge object content over a range of object conjugate distances and thereby provide a three-dimensional floating display. For example, further object content is disposed at a second object conjugate distance, e.g., shorter than the object conjugate distance $z_1$. The lens array assemblies 402, 404 may be configured such that the object and image conjugate distances are equal or substantially equal. As a result, an image of the further object content reconverges at a further image plane that appears (e.g., to the viewer of the floating image) to be disposed in a background of the image plane 412.

FIG. 4 depicts the manner in which a transmissive floating display may be provided without involving a bulky optical system or volume. The floating display instead involves a set of layers or sheets oriented in parallel planes. The floating display can thus be provided by a thin stack or other minimal profile system.

Figure 5:
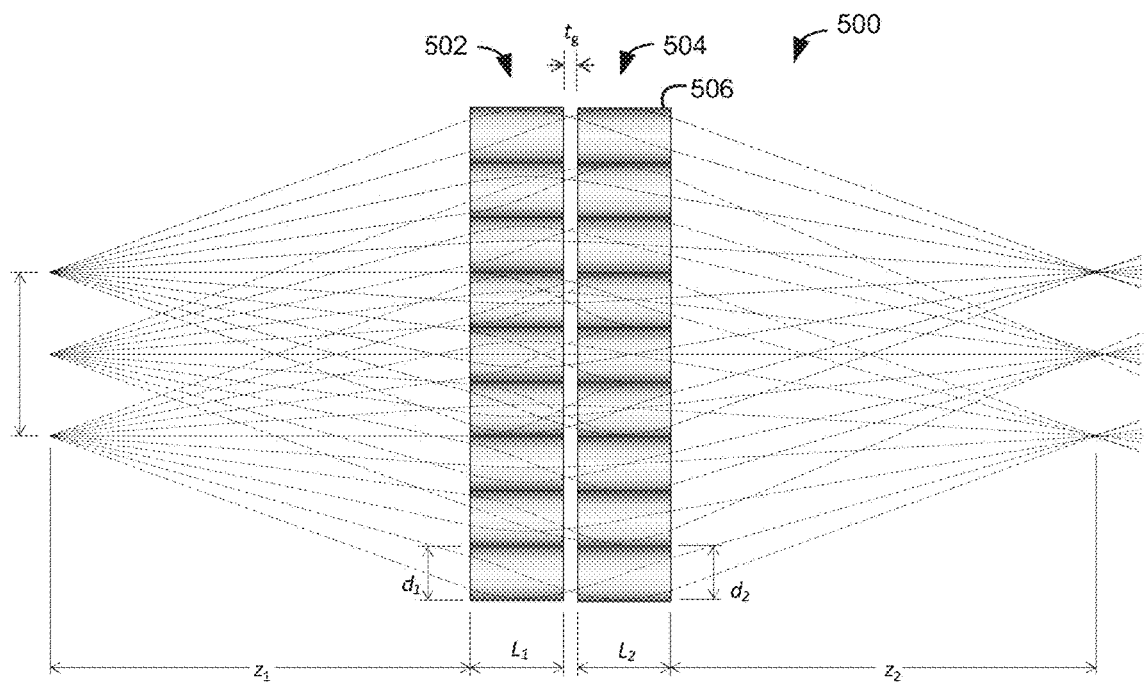
FIG. 5 is a ray trace diagram for a transmissive floating display having a lens system in accordance with an example in which each lens array assembly includes a respective array of graded-index microlensing structures.

FIG. 5 shows a GRIN-based lens system 500 in which two lens array assemblies 502, 504 are positioned relative to one another for reconvergent imaging. Each assembly 502, 504 includes an array of GRIN microlensing structures 506. Each plate has a thickness to provide the equivalent function of a Fourier transform lens pair. While 0.25p pitch GRIN lenses with orthogonal and flat input and output faces provide an FT-equivalent cell, imaging performance of outer rays may be further improved by adding a non-flat, aspheric profile to one or more of the faces of each GRIN microlensing structure 506 within each array. The system 500 may also be used as a transmissive, reconvergent sheet 400 for a high quality floating display.

Each structure 506 provides one of the cells of the lens array assembly 502, 504. To that end, each structure 506 is configured to exhibit, or act as, a pair of Fourier transform lenses. A parabolic refractive index profile versus radial position from the center of each GRIN structure 506 enables each cell to function as a series of two in-tandem Fourier transform pairs, in order to satisfy the above-described constraints of (1) image conjugate formation for each cell and (2) convergence of imaging from multiple cells. Each assembly 502, 504 may thus be configured as a plate having a thickness that provides the equivalent function of the above-described Fourier transform cells formed via a lenslet pair.

Extra-mural absorption (EMA) glass may be used to block light from encountering the edge of an adjacent cell. Other absorbing coatings or layers may be used.

For given total track length (TTL) between image conjugates, the object and image distances may be placed by design to coincide with the outer faces of the GRIN lens length, thus having image conjugates at the outer surfaces, or may be placed at an air gap distance from each of the two outer surfaces. However, the structures 506 are unlike previous GRIN arrays used for image reconvergence or image transfer that have been based on designing a single GRIN lens length, thus only functioning for a specific pair of conjugate distances. The differences involve the realization as described herein that the formation of images in array-based imaging is provided via a series of two Fourier Transform (FT) equivalent subsystems within each cell of the array, and that the Fourier Transform equivalent length for a GRIN lens may be defined as the length for which a collimated input beam forms a focus at the second output surface of the GRIN lens. A gap (zero to non-zero) including optical media, such as air or other optical media, defined by the image conjugate relations may then be disposed between the two Fourier Transform equivalent length GRIN arrays in order to provide array-based reconvergent imaging, which may add versatility of the system to be adjusted for any pair of equal image conjugate distances using two FT-equivalent length GRIN arrays that have the same effective focal length.

In other cases, the system may be adjusted to support unequal conjugate distances by use of two FT equivalent length GRIN arrays that have different focal lengths. Such arrays may be made thinner by use of GRIN fibers or drawing an array of GRIN rods into a boule (or preform) having accurate placement of array spacing, then slicing and polishing faces, in a similar fashion as coherent fiber optic faceplates are fabricated, but with tight control of pitch layout. Further, while a GRIN lens is a lens that exhibits a continuous lensing effect or optical power anywhere along its length, a Fourier Transform equivalent subsystem may also be formed using two or more lens arrays. While a single lens array may be used to form an array of output images which appear to be Fourier Transforms in terms of intensity, these are not Fourier transforms in terms of phase, or telecentrically corrected upon output. The simplest form of an FT equivalent subsystem may then include two lenses having the same focal length placed in tandem at a separation distance equal to the effective focal length. However, in the GRIN lens FT equivalent length case explained above, more than two lenses having various optical powers may be used in series to achieve the equivalent function of a FT-equivalent subsystem. Some cases using microlens arrays to achieve array-based imaging involve use of two in-tandem FT pairs of microlenses, having an air gap or optical path length gap distance defined by image conjugate relations as described herein. In such way, any lens array, including microlens arrays, GRIN lens arrays, or GRIN microlens arrays, may be utilized to form a floating display, as explained herein.

Figure 6:
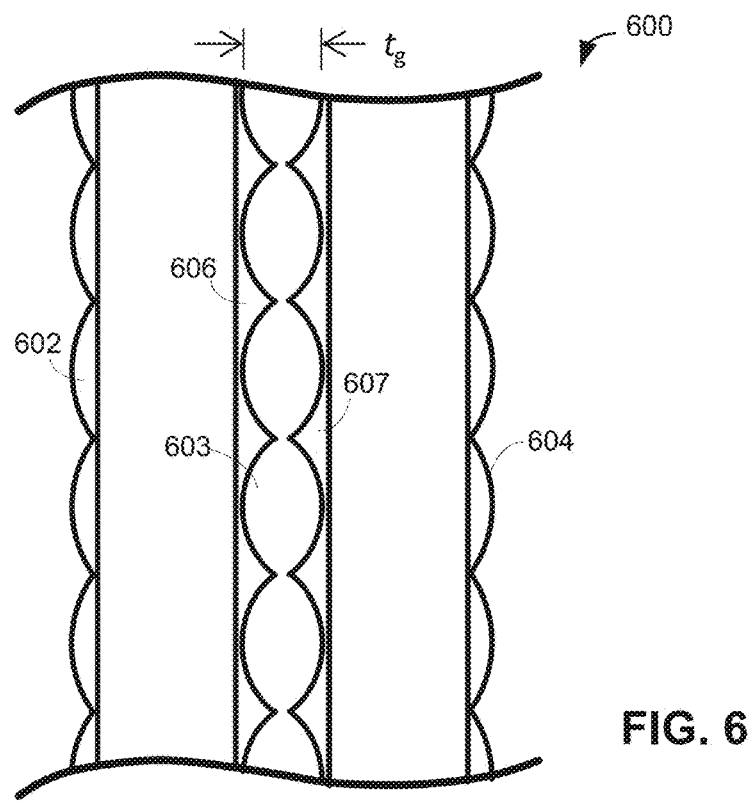
FIG. 6 is a schematic, side view of a lens system of a transmissive floating display in accordance with an example in which each lens array assembly has a respective in-tandem pair of MLAs disposed on opposing sides of a respective substrate.
Figure 7:
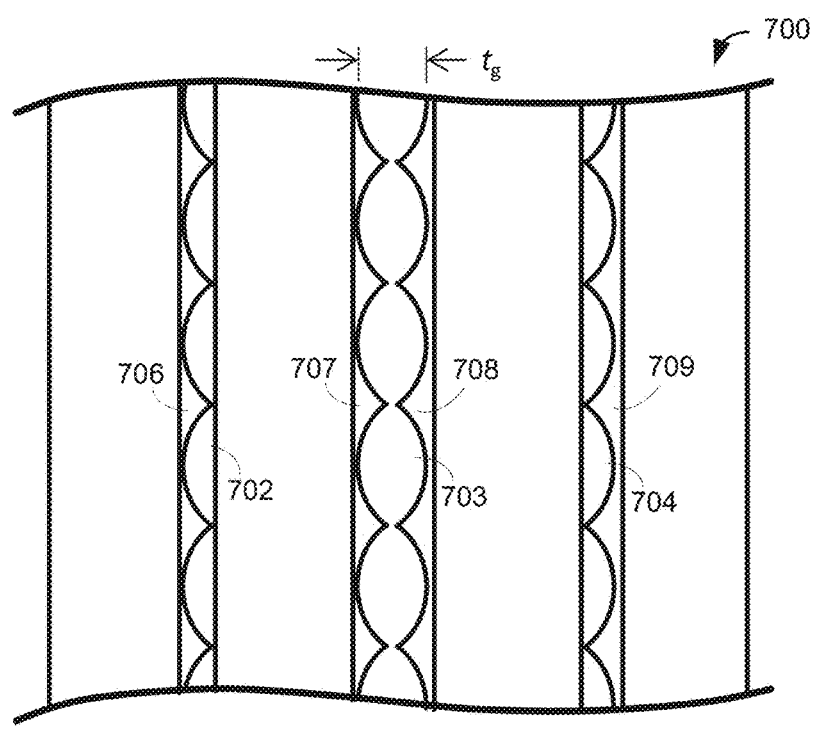
FIG. 7 is a schematic, side view of a lens system of a transmissive floating display in accordance with an example in which each lens array assembly has a respective in-tandem pair of MLAs with each MLA disposed on a respective substrate.

FIGS. 6 and 7 depict alternative lens orientations for use in the transmissive floating display and other lens systems described herein. FIG. 6 shows a two-substrate lens system 600. The layers of the lens system 600 have refractive indices selected in accordance with the orientations of the arrays. For example, lenslet regions 602-604 may have a first refractive index, and lenslet regions 606, 607 may have a second refractive index, where the first refractive index is greater than the second refractive index. In these and other cases, the low (or lower) refractive index may be provided by a low index adhesive or laminate material. FIG. 7 shows a four-substrate lens system 700, in which lenslet regions 702-704 have the high (or higher) refractive indices, and lenslet regions 706-709 have the low (or lower) refractive indices. In each case, the lens arrays of each lens array assembly are oriented in the same direction. Low-index or high-index adhesives and/or other low index media (e.g., air or other gas) or high index media may be disposed between the arrays. In each case, the substrates may have a common refractive index or different refractive indices. Each lens system 600, 700 may be used as a sheet stack for a transmissive floating display.

The relative differences in refractive index may differ in other cases, such as being reversed in cases with different lenslet orientations. The orientation of curvature of the lenslets dictates whether the neighboring optical media has a higher or lower in refractive index. The orientation shown in FIG. 6 indicates convex lenslets on the outer surfaces, having a higher refractive index than the ambient media, while the concave lenslets on the inner surfaces of the substrates leads to optical media disposed between the concave lenslets with a higher refractive index than the lenset media, in order to form positive microlenses. Convex lensets may be used on both sides of each substrate for the case shown in FIG. 3, where optical media in between substrates has a refractive index lower than the lenslet media, such as air or other low index optical media.

Figure 8:
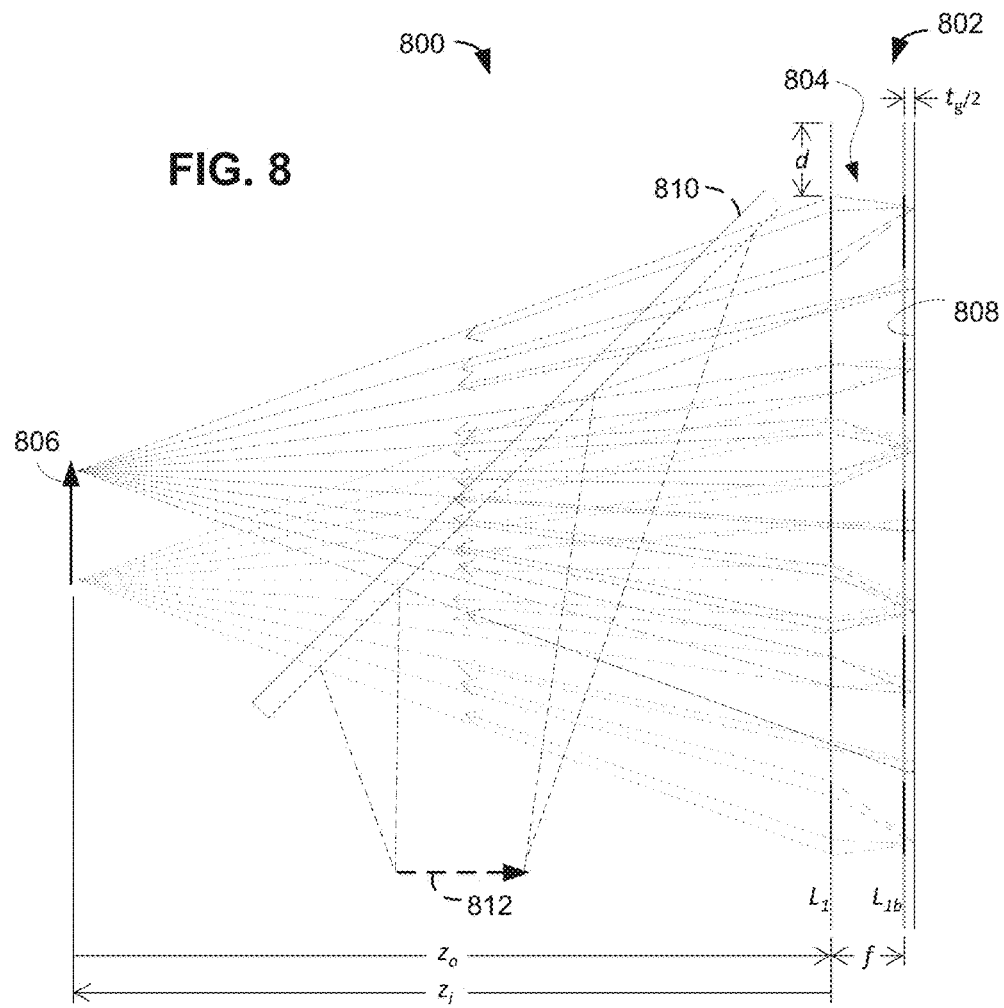
FIG. 8 is a ray trace diagram for a reflective floating display having a lens system with a single lens array assembly in accordance with one example.

FIG. 8 shows a paraxial illustration of reflective, array-based imaging via a lens system 800. The lens system 800 may be used for, or in connection with, retro-reflective floating displays, reconvergent floating displays, conspicuity films, and/or combiners. The lens system 800 includes a lens array assembly 802. Unlike the transmissive floating displays described above, only the single lens array assembly 802 is included. But as with the other lens assemblies, the lens array assembly 802 includes a plurality of cells 804, each cell 804 configured to exhibit a pair of Fourier transform lenses. The lens array assembly 802 is disposed along an optical axis to receive light diverging from an object 806 at a plane disposed at an object conjugate distance $z_o$ from the lens array assembly 802. The lens system 800 further includes a reflective surface 808 disposed along the optical axis for reflection of the light back through the lens array assembly 802 after reflection off of the reflective surface 808. The reflective surface 808 is depicted schematically in FIG. 8. In some cases, the reflective surface 808 is provided by a mirror or other reflective layer, an example of which is shown and described in connection with, e.g., FIG. 9. In this case, the reflective layer 808 is spaced from the lens array assembly 802 along the optical axis. In other cases, the reflective layer 808 is disposed on and along the back side of the lens array assembly 802.

The lens array assembly 802 is configured such that the object light reconverges at an image plane after passing back through the lens array assembly 802. In the paraxial ray tracing of FIG. 8, the image plane corresponds with the plane of the object 806 to depict how the image plane is disposed at an image conjugate distance $z_i$ from the lens array assembly 802 in accordance with the object conjugate distance $z_o$. In this case, the image conjugate distance equals or substantially equals the object conjugate distance.

The lens system 800 may also include a beam splitter 810 to redirect the light processed by the lens array assembly 802 and reflected by the reflective surface 808. The beam splitter 810 may redirect the light toward a viewer in a combiner or other arrangement. In this way, a floating image display 812 may be combined with, for example, ambient scene light. The viewer may be disposed farther outward (e.g., downward in the depiction of FIG. 8) than the location of the floating image display 812. The beam splitter 810 is disposed along the optical axis between the plane of the object 806 and the lens array assembly 802. The beam splitter 810 may be a polarizing beam splitter. Other types of splitters may be used, including, for instance, a half mirror. Without the beam splitter 810, the viewer may be located at a distance farther outward (e.g., leftward in the depiction of FIG. 8) than the object 806.

In other cases, a half mirror may be utilized in conjunction with two lens array assemblies 802, with one assembly 802 placed as shown, and the second assembly 802 disposed along the viewing optical axis behind the half mirror, such that light from the object 806 is split by the half mirror into both optical paths, then retroreflected by each respective lens array assembly 802, and then reconverged at the floating image display 812.

In cases in which a polarization splitter is used instead of the half mirror, the lens system 800 may include a ¼ wavelength retarder layer disposed between the splitter 810 and the reflective layer 808 of the lens assembly 802, such that linear polarized diverging input object light may be converted into circular polarization. The light is then reflected by the reflective layer 808 in the lens assembly 802, then converted from circular polarization to orthogonal linear polarization upon the return pass through the retarder layer, thus improving efficiency of floating image. The retarder layer may be disposed as a separate layer in between the splitter 810 and the lens assembly 802, or may be included as an additional layer integrated within the stack of the lens assembly 802. For instance, in the ray trace diagram of FIG. 8, the retarder layer may be disposed at, and thus schematically depicted by, the space (e.g., a layer) between the rear array of the lens assembly 802 and the reflective layer 808.

In some cases, the lens array assembly includes a pair of in-tandem microlens arrays, examples of which are shown and described in connection with FIGS. 9-16. Each microlens array of the pair includes a respective set of constituent lenslets, as described herein. As a result, each cell of the plurality of cells includes a respective one of the constituent lenslets from each respective set of constituent lenslets.

The lens system 800 may be configured to provide a reflective floating display when the lens array assembly 802 is configured for reconvergence of the object light. As described above, the lens array assembly 802 is reconvergent because each cell exhibits a pair of Fourier transform lenses. As shown in FIG. 8, each cell may be provided by two microlenses or other structures separated by (or effectively separated by) the focal length f of the microlenses.

The lens system 800 may be configured as a non-imaging retroreflector by changing the configuration of the lens array assembly 802. In one microlens array (MLA) example, the arrays are spaced from one another along the optical axis by a distance differing from the common focal length of the lenslets of the arrays. As a result, the light passing back through microlens arrays does not reconverge at an image plane. In another example, the distance between the lens array assembly 802 and the reflective surface 808 is offset from the value dictated by the above-described function (e.g., no longer equal to $t_g/2$). The offset may be made by design such that the retroreflected angular subtend is enlarged compared to the original object size. Use of such offsets in an imaging scenario may result in the display content becoming blurred. For an imaging configuration, the retroreflected angular subtend may be tighter (e.g., much tighter), such as less than 0.1 degrees, or even less than 0.02 degrees. In these ways, the non-imaging retroreflector is thus not configured for reconvergence of the object light, yet will approximately reconverge to the extent that the exit angle subtend is limited.

One example of a non-imaging retroreflector is a conspicuity film. The non-imaging performance may be provided such that the retroreflected angular subtend, e.g., from a road sign, may be large enough for a driver in an automobile to see the retroreflection of the light emanating from the headlights of the automobile, which may typically be only a degree to a few degrees. Other types of non-imaging retroreflectors may be provided by modifying the lens systems as described above. Any of the lens systems directed to providing a reflective floating display described herein may be modified. Thus, for example, a conspicuity film may be provided with the reflective surface disposed on and along the lens array assembly (e.g., the rear microlens array). In those and other MLA cases, the arrays may be disposed on opposing sides of a substrate, the thickness of which establishes a spacing of the lens array assembly. Adjusting the substrate thickness is thus one way to establish the defocusing, non-imaging nature of the system. Examples of such cases are described below.

FIGS. 9-11 depict a number of example reflective optical stacks that may be used to implement the reflective, array-based imaging shown in FIG. 8. A number of different lens orientations and configurations are shown. In each case, a low index adhesive or laminate may be disposed between the respective layers of the stack.

FIG. 9 depicts an example of a lens system 900 in which a pair of microlens arrays 902, 904 are disposed on opposing sides of a substrate 906. A low index adhesive, laminate, or other material 908 may be disposed in an optical gap between the array 904 and a reflective surface 910 of a layer 912 disposed behind the array pair. The gap may present a distance equal to half of the distance (e.g., $t_g/2$) established via the above-described function. Other low index media may be disposed in the gap, including, for instance, air. Other gases may be used.

FIG. 10 shows a lens system 920 with a different array orientation. In this example, the lens system 920 includes arrays 922, 923 disposed on separate substrates 924, 925, respectively. The arrays 922, 923 are oriented in the same direction. The planar side of each lenslet of the arrays 922, 923 is adjacent the respective substrate 924, 925, such that the convex sides facing rearward toward a reflective layer 926. Low index adhesive, laminate, and/or other media may be disposed between the array 922 and the substrate 925, as well as between the array 923 and the reflective layer 926.

The use of separate substrates 924, 925 provides an option to vary the refractive index within the lens system 920. For example, the substrate 924 may have a different refractive index than the substrate 925. One or both of the substrates 924, 925 may have a refractive index differing from that of the arrays 922, 923.

FIG. 11 shows a lens system 930 with multiple substrates 932, 933 and arrays 934, 935 oriented in opposing directions. The lens system 930 may thus be considered to be a hybrid of the above-described systems. The lens system 930 may be otherwise similarly configured.

Figure 13:
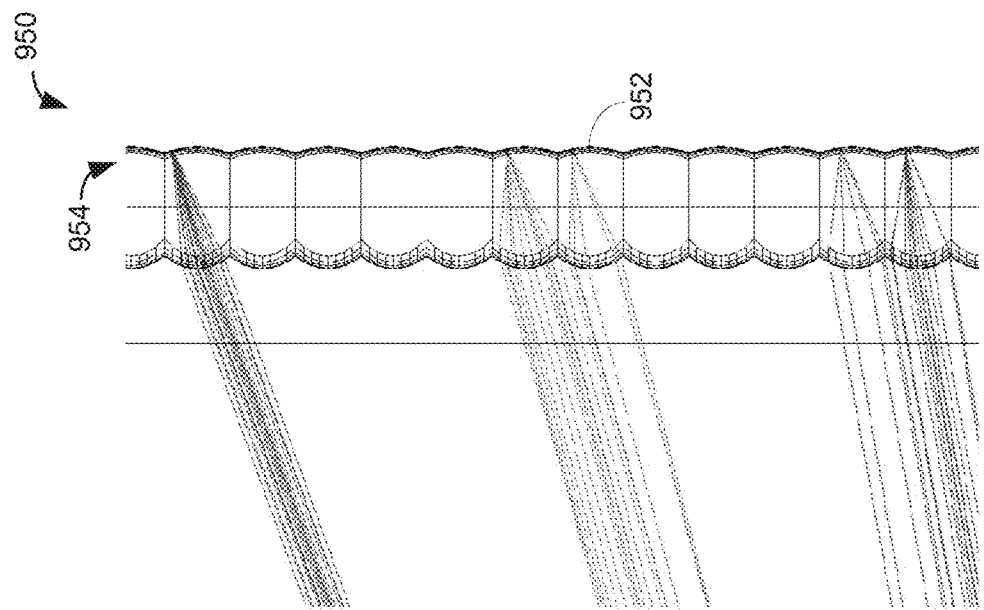
FIGS. 12 and 13 are schematic, side views of MLA-based reflective floating displays having alternative reflective surface arrangements.
Figure 12:
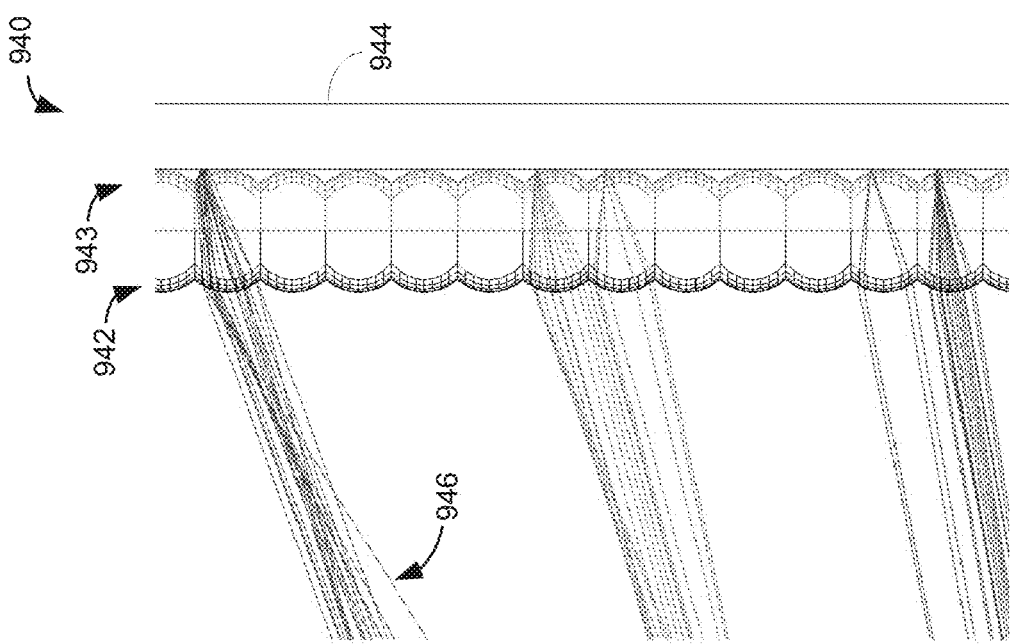

FIGS. 12 and 13 are directed to depicting alternative MLA-based retro-reflective film configurations. The configuration shown in FIG. 13 is capable of achieving higher performance, roll-to-roll fabrication, and other benefits. From symmetry, as described above, the four-layer MLA-based reconvergent sheet may be converted for use in reflective mode by use of only two MLA layers and a mirror. The second layer corrects phase and redirects light such that the mirror reflects the transform efficiently back through the first layer, as described above.

FIG. 12 shows ray tracing for a reflective lens system 940 similar to those described above. The lens system 940 includes MLA layers 942, 943 and a flat mirror 944. The MLA layers 942, 943 are configured as described above to provide reconvergent retroreflection. The MLA layers 942, 943 may be optimized or otherwise configured for reconvergence of object light originating from various object conjugate distances.

FIG. 12 also depicts the potential for stray light 946 to be produced by the interaction of the MLA layers 942, 943 and the flat mirror 944. The stray light 946 may be produced when outlier rays are directed toward the MLA layers 942, 943 at higher angles of incidence. To prevent or reduce the stray light 946 and improve the contrast of the lens system 940, the lens system 940 may include one or more masking layers as described herein.

FIG. 13 depicts an alternative or additional approach or lens system configuration to addressing the outlier rays and reducing stray light. In this case, a lens system 950 includes a reflective surface 952 disposed on and along a rear MLA layer 954. The reflective surface 952 is thus not spaced from the lens array assembly. The lack of a spacing (e.g., $t_g/2$) may not be relevant or significant in some cases (e.g., long object conjugate distances). Alternatively, the thickness of the lens array assembly and/or the rear MLA radius may be adjusted to optimize for various conjugate distances, from far field to near field. The focal length of the lenslets of the rear MLA layer 954 may also be halved, as described and shown below in connection with FIGS. 14 and 15.

The alternative lens system configuration of FIG. 13 is based upon the recognitions that (1) aberrations form a caustic that appears to effectively shorten focal length versus input angle (e.g., field curvature at the rear MLA layer 954), and (2) it is desirable to reflect the light near focus in order to minimize the angular spread of the retroreflected output. In the alternative configuration, the functions of both the mirror and the second MLA layer are combined to improve such alignment and provide the phase correction. This results in a simplified double-sided structure that is reflective coated on the back side.

The alternative lens system configuration of FIG. 13 may be useful in further ways. The structure is well-suited for roll-to-roll manufacturing (e.g., with two-sided alignment and thickness control). The reflector curvature reflects input the light cone accepted from a given angle back through the first layer efficiently, while also providing the phase correction. One or both of the MLA layers may include conic/aspheric profile to improve off-axis performance.

Figure 16:
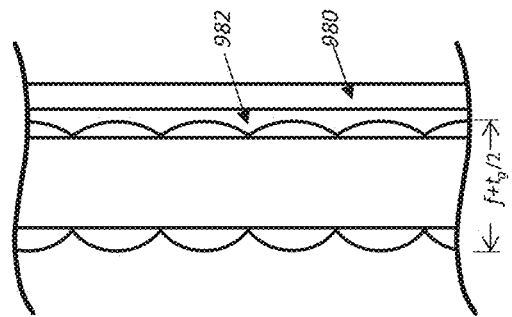
FIGS. 14-16 are schematic, side views of reflective optical stacks using a single substrate in accordance with several examples.
Figure 15:
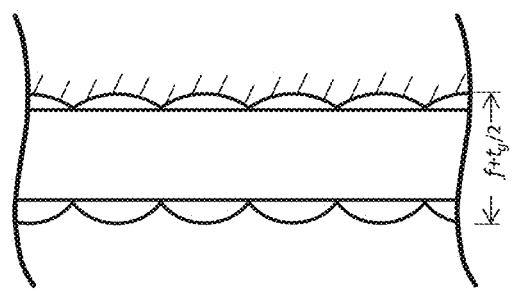
Figure 14:
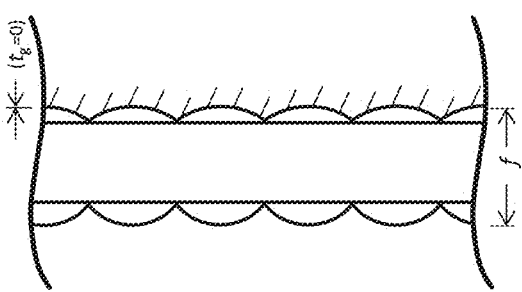
Figure 17:
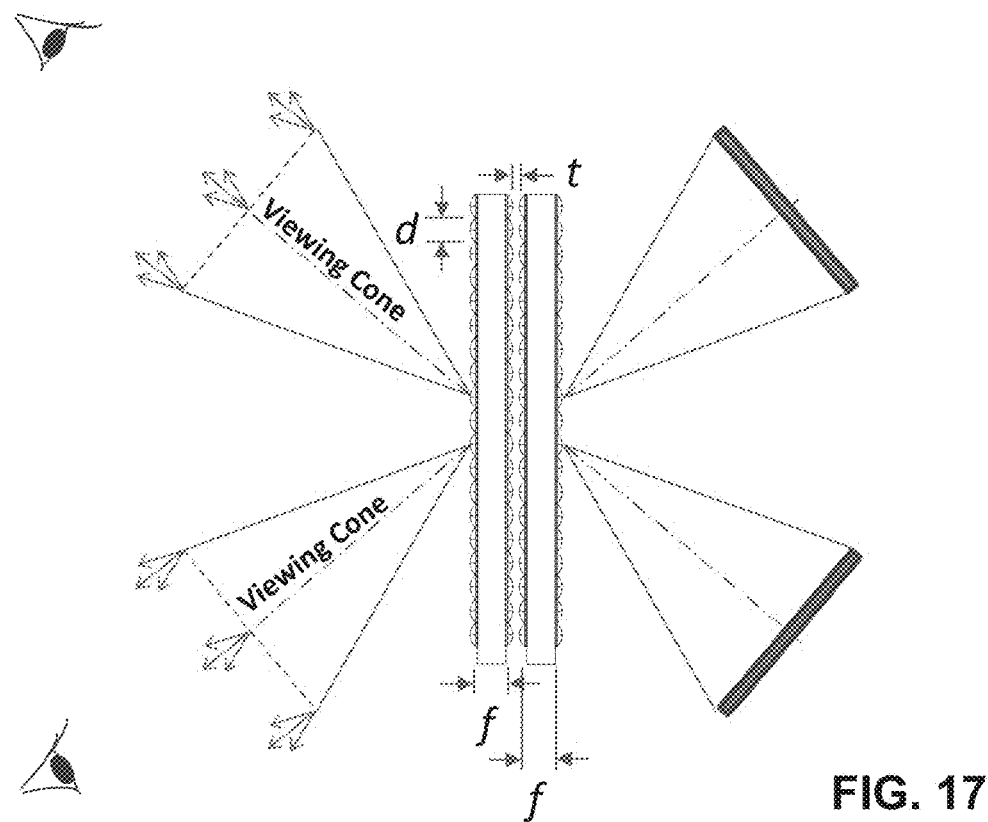
FIGS. 17 and 18 show alternative transmissive floating display configurations involving content hopping to adjacent cells of a lens array assembly.
Figure 18:
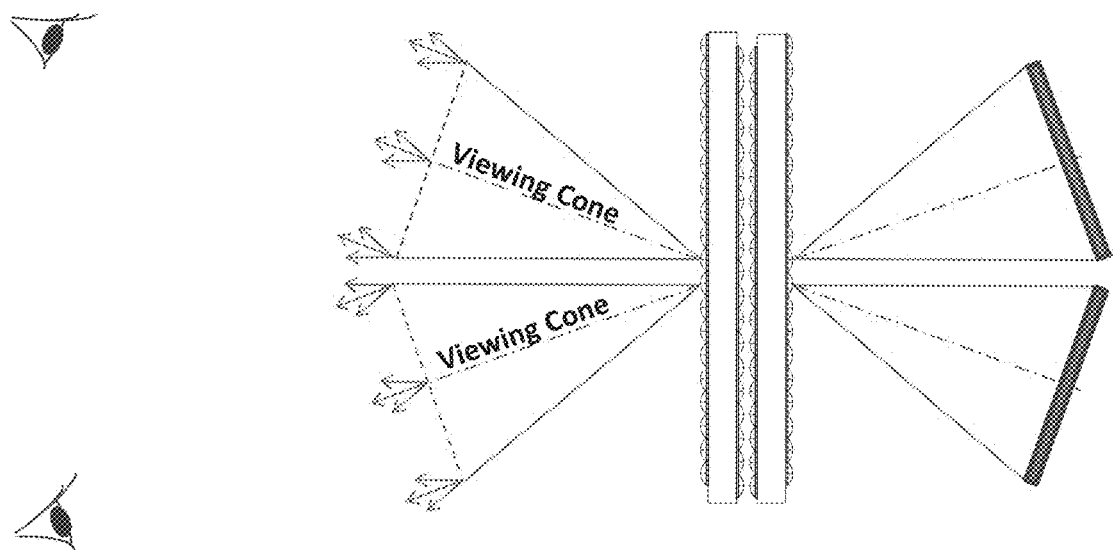

FIGS. 14-16 depict examples of reflective optical stacks using a single substrate. In each case, the MLA layers are disposed on opposing sides of the single substrate. The thickness of the substrates may vary to accommodate, for instance, different object conjugate distances. Because the sheet may be MLA-based, the thickness and back radius parameters may be adjusted to accommodate a range of far to near conjugate distances, or as conspicuity film or other retroreflective film, a variety of conspicuity angles. In other cases, because both the transmitted path from the first array to the second array includes FT-equivalent optical functionality, and also because the reflected optical path from the second array to the first array also includes FT-equivalent optical functionality, the MLA layers may be replaced with a GRIN lens array, e.g., with each cell having 0.25p pitch, and having a $t_g/2$ gap and reflective layer, in order to achieve a retroreflective or reconvergent optical stack.

The example of FIG. 14 includes a substrate having a thickness such that the MLA layers are spaced apart by a distance equal to the focal length of the lenslets of the array. That thickness may be well suited for infinite (or effectively infinite) object conjugate distances. With such object light, the reflective surface is coated or otherwise disposed on the rear MLA layer as shown.

FIG. 15 depicts another example in which the reflective surface is disposed on the rear MLA layer. This case may be nonetheless well suited for use with non-infinite object conjugate distances by adjusting the substrate thickness so that the MLA layers are spaced apart by a distance equal to the lenslet focal length plus half of the gap prescribed by the above-described function.

In each of the examples of FIGS. 14 and 15, the focal length of the constituent lenslets of the rear MLA layer is equal to (or on the order of) half of the focal length of the constituent lenslets of the front MLA layer to compensate for a change in optical power from the reflective surface. Because the focal length in the media may be on order of the thickness of the sheet, this implies the radius of curvature of the constituent lenslets on the rear MLA layer may be on order of the thickness of the sheet, such that light entering the center of each constituent lenslet of the front MLA layer is reflected by the rear MLA layer back toward the originating center of each constituent lenslet of front MLA layer, which implies that the focal length of the back reflective MLA is on order of half of the thickness of sheet.

FIG. 16 depicts an example in which a release liner 980 is used to assemble the system. Because the sheet is a solid film, an adhesive backing 982 and the release liner 980 may be applied to coat the rear MLA layer with the reflective surface, which enables usage as a 'peel and stick' sheet or film for various purposes, such as for floating display and other reconvergent, imaging applications, as well as retroreflective films, conspicuity films, and other non-convergent, non-imaging applications.

Efficiency is substantially higher than state-of-the-art retroreflective films due to high Fill Factor, and is only limited by reflectance of the coated backside, which may be metallized or dichroic coated or Rugate coated, for achieving various efficiency in the range of 70% to nearly 95%. Efficiency approaching 99% may be achieved by adding AR coating on $1^{st}$ layer.

Figure 19:
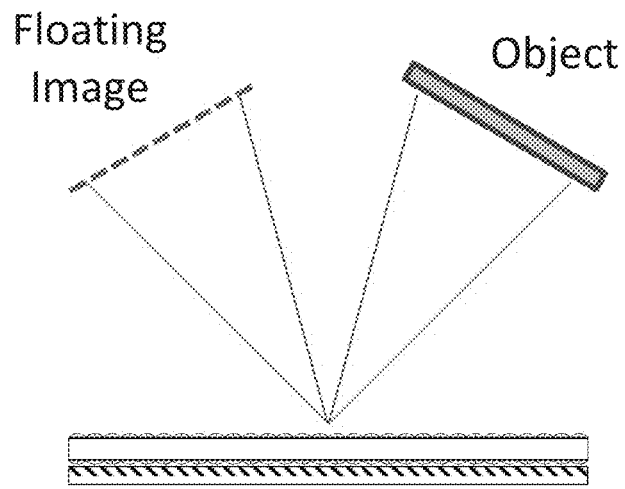
FIGS. 19 and 20 show alternative reflective floating display configurations involving content hopping to adjacent cells of a lens array assembly.
Figure 20:
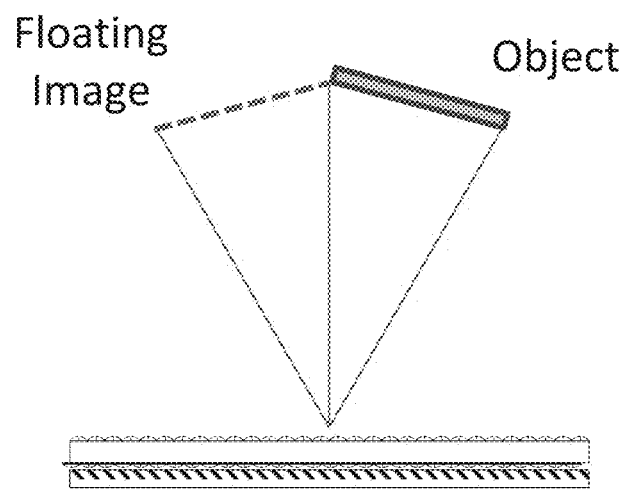

FIGS. 17-20 show configurations in which a hopping effect is used to form the floating image at different locations. The hopping effect may be implemented in connection with both transmissive stacks (FIGS. 17 and 18) and reflective stacks (FIGS. 19 and 20). The hopping effect involves adding enough angular bias to allow object content to transmit through neighboring cells of the array assembly (or neighboring elements of a respective array of the assembly). In each of these cases, the plane of the object is oriented at an angle relative to the lens array assembly such that the light passes through a different cell (e.g., a neighboring cell) of the plurality of cells after the reflection. For cases in which both MLA layers are aligned, object light entering a hopped acceptance cone of one lenslet of the front MLA layer may focus toward a neighboring cell of the back MLA layer, then exit the front MLA layer at a further neighboring cell.

Pitch offsets may be used to vary the extent to which the hopping effect repositions the floating image. FIG. 19 depicts one example. The respective sets of constituent lenslets have offset, rather than aligned, pitches. The offset may be, for instance, equal to half of the pitch. For cases in which the front and back MLA layers are offset by half of the pitch, object light entering a hopped acceptance cone of one lenslet of the front MLA layer may focus toward a partially overlapping but offset cell of the back MLA layer, then exit the front MLA layer at a neighboring cell.

Figure 21:
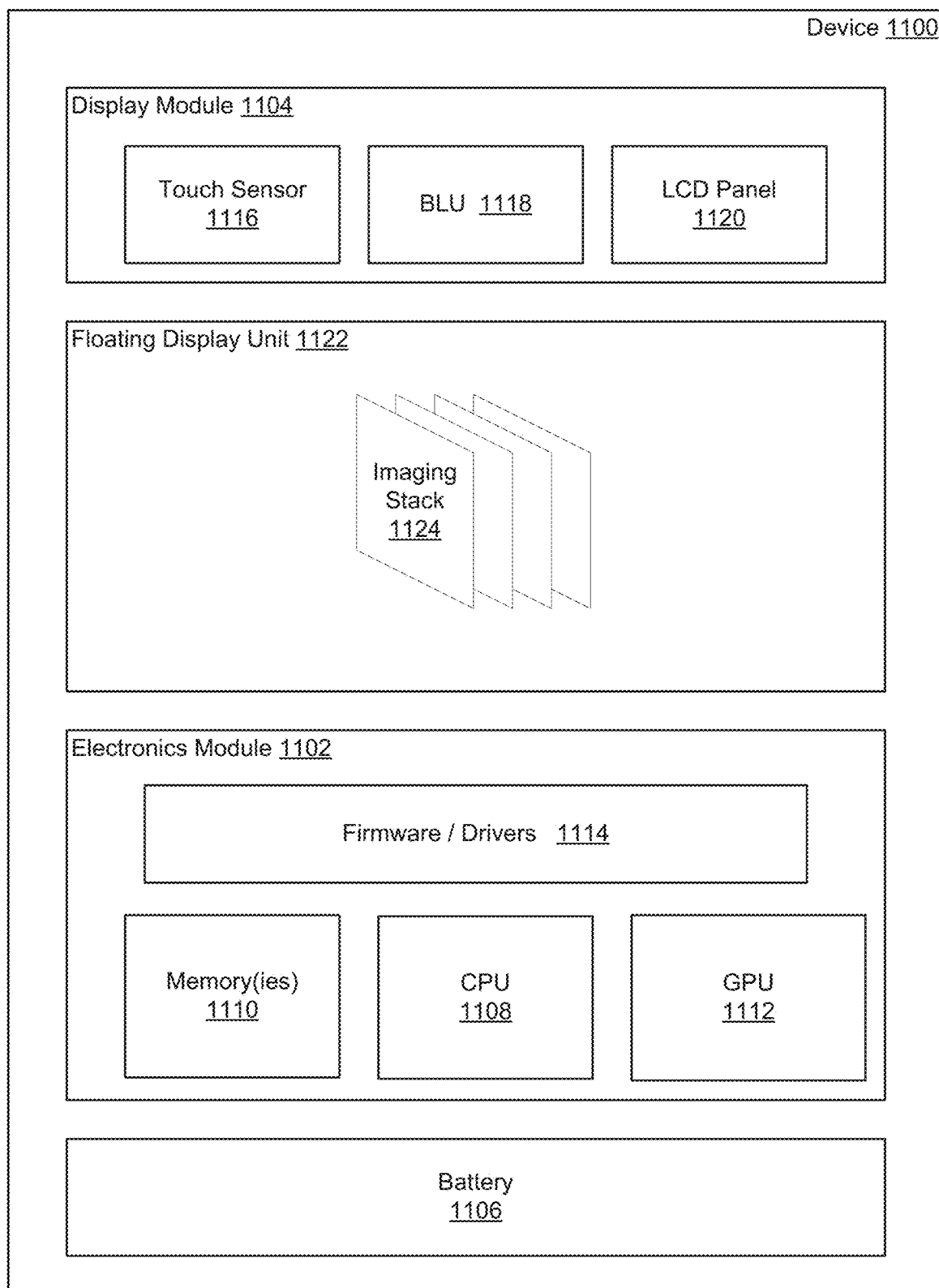
FIG. 21 is a block diagram of an electronic device having an array-based floating display in accordance with one example.

FIG. 21 shows an electronic device 1100 in which the reconvergent imaging of the above-described examples may be incorporated in connection with a floating display. The electronic device 1100 has an electronics module 1102 and a display module 1104 (or subsystem), and a battery 1106. The electronic device 1100 may include additional, fewer, or alternative components. For example, the display module 1104 may be integrated with the electronics module 1102 and/or other components of the electronic device 1100 to a varying extent. For instance, the electronics module 1102 and/or the display module 1104 may include a graphics subsystem of the electronic device 1100. Any number of display modules or systems may be included. In this example, the device 1100 includes a processor 1108 and one or more memories 1110 separate from the display module 1104. The processor 1108 and the memories 1110 may be directed to executing one or more applications implemented by the device 1100. The display module 1104 generates a user interface for an operating environment (e.g., an application environment) supported by the processor 1108 and the memories 1110. The processor 1108 may be a general-purpose processor, such as a central processing unit (CPU), or any other processor or processing unit. Any number of such processors or processing units may be included.

In the example of FIG. 19, the electronics module 1102 includes a graphics processing unit (GPU) 1112 and firmware and/or drivers 1114. The GPU 1112 may be dedicated to graphics- or display-related functionality and/or provide general processing functionality, which may or may not include graphics-related processing in connection with the floating display. Some of the components of the electronics module 1102 may be integrated. For example, the processor 1108, the one or more of the memories 1110, the GPU 1112, and/or the firmware 1114 may be integrated as a system-on-a-chip (SoC) or application-specific integrated circuit (ASIC). The electronics module 1102 may include additional, fewer, or alternative components. For example, the electronics module 1102 may not include a dedicated graphics processor, and instead rely on the CPU 1108 or other general-purpose processor to support the graphics-related functionality of the electronic device 1100. The electronics module 1102 may include additional memory (or memories) to support display-related processing.

In the example of FIG. 19, the display module 1104 includes a touch sensor 1116, a backlight unit (BLU) 1118, and an LCD panel or unit 1120. The touch sensor 1116, the backlight unit 1116, and/or the LCD unit 1120 may be directed to forming a display separate from, or integrated with to any desired extent, the fingerprint detection hardware. Additional, fewer, or alternative display components may be provided. For example, in some cases, the display module 1104 does not include a touch sensor unit.

The electronic device 1100 includes a floating display unit 1122, which may be related to and/or distinct from the display module 1104. The floating display unit 1122 may be integrated with the display module 1104 to any desired extent.

The floating display unit 1122 may be configured in accordance with one or more of the examples described above. In the example of FIG. 19, the floating display unit 1122 includes a reconvergent imaging stack 1124 to provide a transmissive floating display. In other cases, a reflective stack is used to provide a reflective floating display. Further examples may include a shaped coherent guide plate or shaped fiber optic faceplate, e.g., a faceplate having a flat side and a shaped side, the flat side being disposed over and adjacent to the display panel, which may include LCD or OLED or other display panels, such that display light is coupled into the coherent guide plate, and then propagated toward the shaped side of guide plate to then diffusely exit the shaped side of guide plate. In so doing, a typical two-dimensional display panel may be converted into a display having three-dimensional surface contour of apparent emission, which may then be utilized as the input object of the lens system, thus enabling formation of a three-dimensional floating display. Further still, in similar manner, other types of three-dimensional displays may be utilized as the object in order to convert any given three-dimensional display into a three-dimensional floating display.

The device 1100 may be configured as one of a wide variety of computing devices, including, but not limited to, handheld or wearable computing devices (e.g., tablets and watches), communication devices (e.g., phones), laptop or other mobile computers, personal computers (PCs), and other devices. The device 1100 may also be configured as an electronic display device, such as a computer monitor, a television, or other display or visual output device. In such cases, the device 1100 may not include one or more of the above-described components, such as the battery 1106.

In one aspect, a lens system includes a first lens array assembly including a first plurality of cells, each cell of the first plurality of cells configured to exhibit a pair of first Fourier transform lenses, and a second lens array assembly including a second plurality of cells, each cell of the second plurality of cells configured to exhibit a pair of second Fourier transform lenses. The first and second lens array assemblies are positioned relative to one another along an optical axis of the lens system such that light diverging from an object at a plane disposed at an object conjugate distance from the first lens array assembly reconverges at an image plane after passing through the first and second lens array assemblies. The image plane is disposed at an image conjugate distance from the second lens array assembly in accordance with the object conjugate distance.

In another aspect, a lens system includes a lens array assembly including a plurality of cells, each cell of the plurality of cells configured to exhibit a pair of Fourier transform lenses, the lens array assembly disposed along an optical axis to receive light diverging from an object at a plane disposed at an object conjugate distance from the lens array assembly, and a reflective surface disposed along the optical axis for reflection of the light back through the lens array assembly after reflection off of the reflective surface. The lens array assembly is configured such that the light reconverges at an image plane after passing back through the lens array assembly. The image plane is disposed at an image conjugate distance from the lens array assembly in accordance with the object conjugate distance.

In yet another aspect, a lens system includes a pair of in-tandem microlens arrays, each microlens array of the pair including a respective set of lenslets, each lenslet having a common focal length, the pair of in-tandem microlens arrays disposed along an optical axis to receive light diverging from an object, and a reflective surface disposed along the optical axis for redirection of the light back through the pair of in-tandem microlens arrays after reflection off of the reflective surface. The in-tandem microlens arrays of the pair are spaced from one another along the optical axis by a distance offset from the common focal length such that the light passing back through the pair of in-tandem microlens arrays re-converges with angular spread.

In connection with any one of the aforementioned aspects, the systems and devices may alternatively or additionally include any combination of one or more of the following aspects or features. The image conjugate distance is established via a function of the object conjugate distance, a distance between the first and second lens array assemblies, a first focal length of the first plurality of cells, a second focal length of the second plurality of cells, a first pitch of the first plurality of cells, and a second pitch of the second plurality of cells. The function establishes that the light diverging from the object reconverges at the image conjugate distance. The first and second lens array assemblies are spaced apart from one another by a gap of optical media. The image plane is a floating image plane. The image conjugate distance substantially equals the object conjugate distance. The plane of the object and the image plane are oriented in parallel. The plane of the object and the image plane are oriented orthogonally to the optical axis of the lens system. The plane of the object and the image plane are oriented orthogonally to a line oriented at an angle to the optical axis of the lens system. The pairs of first and second Fourier transform lenses have a common focal length. The lens system further includes a display disposed at the object conjugate distance. Further object content is disposed at a second object conjugate distance shorter than the object conjugate distance of the plane. The first and second lens array assemblies are configured such that an image of the further object content reconverges at a further image plane that appears to be disposed in a background of the image plane. The first lens array assembly includes a first pair of in-tandem microlens arrays, each microlens array of the first pair including a respective set of constituent lenslets such that each cell of the first plurality of cells includes a respective one of the constituent lenslets from each respective set of constituent lenslets, each constituent lenslet having a first common focal length. The second lens array assembly includes a second pair of in-tandem microlens arrays, each microlens array of the second pair including a respective set of constituent lenslets such that each cell of the second plurality of cells includes a respective one of the constituent lenslets from each respective set of constituent lenslets, each constituent lenslet having a second common focal length. The in-tandem microlens arrays of the first pair are separated from one another along the optical axis of the lens system by the first common focal length. The in-tandem microlens arrays of the second pair are separated from one another along the optical axis of the lens system by the second common focal length. The first and second pairs of in-tandem microlens arrays are positioned relative to one another along the optical axis such that the image is provided at the image conjugate distance. The first and second common focal lengths are equal to one another. The first lens array assembly includes a first array of graded-index microlensing structures. Each graded-index microlensing structure of the first array corresponds with a respective one of the first plurality of cells. The second lens array assembly includes a second array of graded-index microlensing structures. Each graded-index microlensing structure of the second array corresponds with a respective one of the second plurality of cells. The lens system further includes a reflective layer that provides the reflective surface, the reflective layer spaced from the lens array assembly along the optical axis. The lens array assembly includes a pair of in-tandem microlens arrays, each microlens array of the pair including a respective set of constituent lenslets such that each cell of the plurality of cells includes a respective one of the constituent lenslets from each respective set of constituent lenslets. The pair of in-tandem microlens arrays includes a first microlens array and a second microlens array, and the reflective surface is disposed on the second microlens array. A focal length of the constituent lenslets of the second microlens array is equal to half of a focal length of the constituent lenslets of the first microlens array to compensate for a change in optical power from the reflective surface. The respective sets of constituent lenslets have offset pitches. The plane of the object is oriented at an angle relative to the lens array assembly such that the light passes through a different cell of the plurality of cells after the reflection. The lens system further includes a display disposed at the object conjugate distance, such that the image plane is a floating image plane of object content provided by the display. The lens system further includes a splitter disposed along the optical axis between the plane and the lens array assembly to redirect the light passing back through the lens array assembly. The splitter includes a polarization splitter. The lens assembly includes an integrated retarder layer. The reflective surface is disposed on one of the pair of in-tandem microlens arrays. The lens system further includes a substrate having opposing sides on which the microlens arrays of the pair are respectively disposed, the substrate having a thickness that establishes a spacing of the in-tandem microlens arrays of the pair.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding only, and no unnecessary limitations should be understood therefrom, as modifications within the scope of the invention may be apparent to those having ordinary skill in the art.

What is claimed is:

1. A lens system comprising:
a first lens array assembly comprising a first plurality of cells, wherein the first plurality of cells defines a first plane, each cell of the first plurality of cells configured to exhibit a pair of first Fourier transform lenses positioned in normal direction to the first plane, wherein the pair of first Fourier transform lenses of the first lens array are separated in the first plane by a focal length of the first Fourier transform lenses to perform a phase correction; and
a second lens array assembly comprising a second plurality of cells, wherein the second plurality of cells defines a second plane, each cell of the second plurality of cells configured to exhibit a pair of second Fourier transform lenses positioned in normal direction to the second plane, wherein the pair of second Fourier transform lenses of the second lens array are separated in the second plane by a focal length of the second Fourier transform lenses to perform a phase correction;
wherein:
the first and second lens array assemblies are positioned relative to one another along an optical axis of the lens system such that light diverging from an object at a plane disposed at an object conjugate distance from the first lens array assembly reconverges at an image plane after passing through the first and second lens array assemblies; and
the image plane is disposed at an image conjugate distance from the second lens array assembly in accordance with the object conjugate distance.

2. The lens system of claim 1, wherein:
the image conjugate distance is established via a function of the object conjugate distance, a distance between the first and second lens array assemblies, a first focal length of the first plurality of cells, a second focal length of the second plurality of cells, a first pitch of the first plurality of cells, and a second pitch of the second plurality of cells; and
the function establishes that the light diverging from the object reconverges at the image conjugate distance.

3. The lens system of claim 1, wherein the first and second lens array assemblies are spaced apart from one another by a gap of optical media.

4. The lens system of claim 1, wherein the image plane is a floating image plane.

5. The lens system of claim 1, wherein the image conjugate distance substantially equals the object conjugate distance.

6. The lens system of claim 1, wherein the plane of the object and the image plane are oriented in parallel.

7. The lens system of claim 6, wherein the plane of the object and the image plane are oriented orthogonally to the optical axis of the lens system.

8. The lens system of claim 6, wherein the plane of the object and the image plane are oriented orthogonally to a line oriented at an angle to the optical axis of the lens system.

9. The lens system of claim 1, wherein the pairs of first and second Fourier transform lenses have a common focal length.

10. The lens system of claim 1, further comprising a display disposed at the object conjugate distance.

11. The lens system of claim 1, wherein:
further object content is disposed at a second object conjugate distance shorter than the object conjugate distance of the plane; and
the first and second lens array assemblies are configured such that an image of the further object content reconverges at a further image plane that appears to be disposed in a background of the image plane.

12. The lens system of claim 1, wherein:
the first lens array assembly comprises a first pair of in-tandem microlens arrays, each microlens array of the first pair comprising a respective set of constituent lenslets such that each cell of the first plurality of cells comprises a respective one of the constituent lenslets from each respective set of constituent lenslets, each constituent lenslet having a first common focal length;
the second lens array assembly comprises a second pair of in-tandem microlens arrays, each microlens array of the second pair comprising a respective set of constituent lenslets such that each cell of the second plurality of cells comprises a respective one of the constituent lenslets from each respective set of constituent lenslets, each constituent lenslet having a second common focal length;

the in-tandem microlens arrays of the first pair are separated from one another along the optical axis of the lens system by the first common focal length;

the in-tandem microlens arrays of the second pair are separated from one another along the optical axis of the lens system by the second common focal length; and the first and second pairs of in-tandem microlens arrays are positioned relative to one another along the optical axis such that the image is provided at the image conjugate distance.

13. The lens system of claim 12, wherein the first and second common focal lengths are equal to one another.

14. The lens system of claim 1, wherein:

the first lens array assembly comprises a first array of graded-index microlensing structures;

each graded-index microlensing structure of the first array corresponds with a respective one of the first plurality of cells;

the second lens array assembly comprises a second array of graded-index microlensing structures; and each graded-index microlensing structure of the second array corresponds with a respective one of the second plurality of cells.

15. A lens system comprising:

a lens array assembly comprising a plurality of cells, wherein the plurality of cells defines a plane, each cell of the plurality of cells configured to exhibit a pair of Fourier transform lenses positioned in normal direction to the plane, wherein the pair of Fourier transform lenses of the lens array are separated in the plane by a focal length of the Fourier transform lenses to perform a phase correction, the lens array assembly disposed along an optical axis to receive light diverging from an object at a plane disposed at an object conjugate distance from the lens array assembly; and a reflective surface disposed along the optical axis for reflection of the light back through the lens array assembly after reflection off of the reflective surface;

wherein:

the lens array assembly is configured such that the light reconverges at an image plane after passing back through the lens array assembly; and the image plane is disposed at an image conjugate distance from the lens array assembly in accordance with the object conjugate distance.

16. The lens system of claim 15, further comprising a reflective layer that provides the reflective surface, the reflective layer spaced from the lens array assembly along the optical axis.

17. The lens system of claim 15, wherein the lens array assembly comprises a pair of in-tandem microlens arrays, each microlens array of the pair comprising a respective set of constituent lenslets such that each cell of the plurality of cells comprises a respective one of the constituent lenslets from each respective set of constituent lenslets.

18. The lens system of claim 17, wherein:

the pair of in-tandem microlens arrays comprises a first microlens array and a second microlens array;

the reflective surface is disposed on the second microlens array; and a focal length of the constituent lenslets of the second microlens array is equal to half of a focal length of the constituent lenslets of the first microlens array to compensate for a change in optical power from the reflective surface.

19. The lens system of claim 17, wherein the respective sets of constituent lenslets have offset pitches.

20. The lens system of claim 15, wherein the plane of the object is oriented at an angle relative to the lens array assembly such that the light passes through a different cell of the plurality of cells after the reflection.

21. The lens system of claim 15, further comprising a display disposed at the object conjugate distance, wherein the image plane is a floating image plane of object content provided by the display.

22. The lens system of claim 15, further comprising a splitter disposed along the optical axis between the plane and the lens array assembly to redirect the light passing back through the lens array assembly.

23. The lens system of claim 22, wherein:

the splitter comprises a polarization splitter; and the lens assembly comprises an integrated retarder layer.

24. A lens system comprising:

a pair of in-tandem microlens arrays, wherein the microlens arrays define a plane, each microlens array of the pair comprising a respective set of lenslets, each lenslet having a common focal length, wherein the lenslets of the in-tandem microlens arrays are separated in the plane of the microlens arrays by the focal length of the lenslets to perform a phase correction, the pair of in-tandem microlens arrays disposed along an optical axis to receive light diverging from an object; and a reflective surface disposed along the optical axis for redirection of the light back through the pair of in-tandem microlens arrays after reflection off of the reflective surface;

wherein:

the in-tandem microlens arrays of the pair are spaced from one another along the optical axis by a distance offset from the common focal length such that the light passing back through the pair of in-tandem microlens arrays re-converges with angular spread.

25. The lens system of claim 24, wherein the reflective surface is disposed on one of the pair of in-tandem microlens arrays.

26. The lens system of claim 24, further comprising a substrate having opposing sides on which the microlens arrays of the pair are respectively disposed, the substrate having a thickness that establishes a spacing of the in-tandem microlens arrays of the pair.

* * * * *